US011237095B2

(12) United States Patent
Rodier et al.

(10) Patent No.: US 11,237,095 B2
(45) Date of Patent: Feb. 1, 2022

(54) PARTICLE DETECTION SYSTEMS AND METHODS FOR ON-AXIS PARTICLE DETECTION AND/OR DIFFERENTIAL DETECTION

(71) Applicant: PARTICLE MEASURING SYSTEMS, INC., Boulder, CO (US)

(72) Inventors: Daniel Rodier, Boulder, CO (US); James Lumpkin, Boulder, CO (US); Dwight Sehler, Boulder, CO (US); Brian Knollenberg, Boulder, CO (US)

(73) Assignee: PARTICLE MEASURING SYSTEMS, INC., Boulder, CO (US)

( * ) Notice: Subject to any disclaimer, the term of this patent is extended or adjusted under 35 U.S.C. 154(b) by 0 days.

(21) Appl. No.: 16/857,678

(22) Filed: Apr. 24, 2020

(65) Prior Publication Data
US 2020/0355599 A1 Nov. 12, 2020

Related U.S. Application Data

(60) Provisional application No. 62/838,835, filed on Apr. 25, 2019.

(51) Int. Cl.
*G01N 15/14* (2006.01)
*G01N 15/00* (2006.01)

(52) U.S. Cl.
CPC .  *G01N 15/1436* (2013.01); *G01N 2015/0065* (2013.01)

(58) Field of Classification Search
CPC ....... G01N 15/1436; G01N 2015/0065; G01N 2015/145; G01N 15/1434; G01N 2015/1493; G01N 15/1429; G01N 15/1459
See application file for complete search history.

(56) References Cited

U.S. PATENT DOCUMENTS

| | | | |
|---|---|---|---|
| 4,540,283 | A | 9/1985 | Bachalo |
| 4,594,715 | A | 6/1986 | Knollenberg |
| 4,690,561 | A | 9/1987 | Ito |
| 4,783,599 | A | 11/1988 | Borden |
| 4,798,465 | A | 1/1989 | Knollenberg |

(Continued)

FOREIGN PATENT DOCUMENTS

| | | |
|---|---|---|
| AU | 2004256318 | 7/2004 |
| CN | 1587984 | 3/2005 |

(Continued)

OTHER PUBLICATIONS

Allen (1983) "Particle Size Analysis," John Wiley & Sons; ISBN: 0471262218 (table of contents only), 5 pp.

(Continued)

*Primary Examiner* — Roy M Punnoose
(74) *Attorney, Agent, or Firm* — Leydig, Voit & Mayer, Ltd.

(57) ABSTRACT

Provided herein are optical systems and methods for detecting and characterizing particles. Systems and method are provided which increase the sensitivity of an optical particle counter and allow for detection of smaller particles while analyzing a larger fluid volume. The described systems and methods allow for sensitive and accurate detection and size characterization of nanoscale particles (e.g., less than 50 nm, optionally less than 20 nm, optionally less than 10 nm) for large volumes of analyzed fluids.

24 Claims, 6 Drawing Sheets

(56) References Cited

U.S. PATENT DOCUMENTS

| | | |
|---|---|---|
| 4,806,774 A | 2/1989 | Lin et al. |
| 4,854,705 A | 8/1989 | Bachalo |
| 4,893,928 A | 1/1990 | Knollenberg |
| 4,906,094 A | 3/1990 | Ashida |
| 4,917,494 A | 4/1990 | Poole et al. |
| 4,963,003 A | 10/1990 | Hiiro |
| 4,989,978 A | 2/1991 | Groner |
| 5,063,301 A | 11/1991 | Turkevich et al. |
| 5,282,151 A | 1/1994 | Knollenberg |
| 5,283,199 A | 2/1994 | Bacon, Jr. et al. |
| 5,471,298 A | 11/1995 | Moriya |
| 5,532,943 A | 7/1996 | Asano et al. |
| 5,660,985 A | 8/1997 | Pieken et al. |
| 5,671,046 A | 9/1997 | Knowlton |
| 5,719,667 A | 2/1998 | Miers |
| 5,726,753 A | 3/1998 | Sandberg |
| 5,739,527 A | 4/1998 | Hecht et al. |
| 5,751,422 A | 5/1998 | Mitchell |
| 5,805,281 A | 9/1998 | Knowlton et al. |
| 5,861,950 A | 1/1999 | Knowlton |
| 5,889,589 A | 3/1999 | Sandberg |
| 5,903,338 A | 5/1999 | Mavliev et al. |
| 5,999,256 A | 12/1999 | Jones |
| 6,084,671 A | 7/2000 | Holcomb |
| 6,137,572 A | 10/2000 | DeFreez et al. |
| 6,167,107 A | 12/2000 | Bates |
| 6,246,474 B1 | 6/2001 | Cerni et al. |
| 6,275,290 B1 | 8/2001 | Cerni et al. |
| 6,532,067 B1 | 3/2003 | Chang et al. |
| 6,615,679 B1 | 9/2003 | Knollenberg et al. |
| 6,709,311 B2 | 3/2004 | Cerni |
| 6,859,277 B2 | 2/2005 | Wagner et al. |
| 6,903,818 B2 | 6/2005 | Cerni et al. |
| 6,945,090 B2 | 9/2005 | Rodier |
| 7,030,980 B1 | 4/2006 | Sehler et al. |
| 7,088,446 B2 | 8/2006 | Cerni |
| 7,088,447 B1 | 8/2006 | Bates et al. |
| 7,092,078 B2 | 8/2006 | Nagai et al. |
| 7,208,123 B2 | 4/2007 | Knollenberg et al. |
| 7,235,214 B2 | 6/2007 | Rodier et al. |
| RE39,783 E | 8/2007 | Cerni et al. |
| 7,456,960 B2 | 11/2008 | Cerni et al. |
| 7,526,158 B2 | 4/2009 | Novotny et al. |
| 7,528,959 B2 | 5/2009 | Novotny et al. |
| 7,561,267 B2 | 7/2009 | Luo et al. |
| 7,576,857 B2 | 8/2009 | Wagner |
| 7,630,147 B1 | 12/2009 | Kar et al. |
| 7,667,839 B2 | 2/2010 | Bates |
| 7,746,469 B2 | 6/2010 | Shamir et al. |
| 7,796,255 B2 | 9/2010 | Miller |
| 7,876,450 B2 | 1/2011 | Novotny et al. |
| 7,916,293 B2 | 3/2011 | Mitchell et al. |
| 7,973,929 B2 | 7/2011 | Bates |
| 7,985,949 B2 | 7/2011 | Rodier |
| 8,027,035 B2 | 9/2011 | Mitchell et al. |
| 8,109,129 B2 | 2/2012 | Gorbunov |
| 8,154,724 B2 | 4/2012 | Mitchell et al. |
| 8,174,697 B2 | 5/2012 | Mitchell et al. |
| 8,427,642 B2 | 4/2013 | Mitchell et al. |
| 8,465,791 B2 | 6/2013 | Liu et al. |
| 8,800,383 B2 | 8/2014 | Bates |
| 8,822,952 B2 | 9/2014 | Muto et al. |
| 8,869,593 B2 | 10/2014 | Gorbunov et al. |
| 9,068,916 B2 | 6/2015 | Heng |
| 9,631,222 B2 | 4/2017 | Ketcham et al. |
| 9,638,665 B2 | 5/2017 | Gorbunov |
| 9,682,345 B2 | 6/2017 | Gromala et al. |
| 9,808,760 B2 | 11/2017 | Gromala et al. |
| 9,810,558 B2 | 11/2017 | Bates et al. |
| 9,857,284 B1 | 1/2018 | Javadi et al. |
| 9,885,640 B2 | 2/2018 | Ketcham et al. |
| 9,952,136 B2 | 4/2018 | Javadi et al. |
| 9,983,113 B2 | 5/2018 | Matsuda et al. |
| 9,989,462 B2 | 6/2018 | Lumpkin et al. |
| 10,197,487 B2 | 2/2019 | Knollenberg et al. |
| 10,345,200 B2 | 7/2019 | Scialo et al. |
| 10,345,246 B2 | 7/2019 | Tian et al. |
| 10,371,620 B2 | 8/2019 | Knollenberg et al. |
| 10,416,069 B2 | 9/2019 | Saitou et al. |
| 10,792,694 B2 | 10/2020 | Gorbunov et al. |
| 10,859,487 B2 | 12/2020 | Knollenberg et al. |
| 10,908,059 B2 | 2/2021 | Knollenberg et al. |
| 10,921,229 B2 | 2/2021 | Shamir |
| 10,928,293 B2 | 2/2021 | Knollenberg et al. |
| 2004/0021868 A1* | 2/2004 | Ortyn .............. G02B 7/28 356/419 |
| 2004/0023293 A1* | 2/2004 | Kreimer ............ F28D 15/02 506/6 |
| 2004/0036874 A1 | 2/2004 | Kramer |
| 2005/0028593 A1 | 2/2005 | Rodier |
| 2005/0138934 A1 | 6/2005 | Weigert et al. |
| 2007/0030492 A1 | 2/2007 | Novotny et al. |
| 2007/0165225 A1 | 7/2007 | Trainer |
| 2007/0263215 A1 | 11/2007 | Bachalo et al. |
| 2008/0079929 A1 | 4/2008 | Luo et al. |
| 2009/0078862 A1 | 3/2009 | Rodier et al. |
| 2009/0128810 A1 | 5/2009 | Bates |
| 2009/0190128 A1 | 7/2009 | Cerni et al. |
| 2009/0268202 A1 | 10/2009 | Wagner |
| 2009/0323061 A1 | 12/2009 | Novotny et al. |
| 2010/0328657 A1 | 12/2010 | Dholakia et al. |
| 2012/0100521 A1 | 4/2012 | Soper et al. |
| 2014/0226158 A1 | 8/2014 | Trainer |
| 2015/0000595 A1 | 1/2015 | Gorbunov et al. |
| 2015/0259723 A1 | 9/2015 | Hartigan et al. |
| 2015/0260628 A1 | 9/2015 | Shamir |
| 2016/0126081 A1 | 5/2016 | Gorbunov |
| 2016/0139013 A1 | 5/2016 | Gorbunov |
| 2017/0059485 A1 | 3/2017 | Yamamoto et al. |
| 2017/0191924 A1 | 7/2017 | Pristinski |
| 2018/0266938 A1 | 9/2018 | Chow |
| 2018/0269250 A1 | 9/2018 | Chow |
| 2018/0270434 A1 | 9/2018 | Chow |
| 2018/0270435 A1 | 9/2018 | Chow |
| 2019/0250785 A1 | 8/2019 | Pandolfi et al. |
| 2019/0277745 A1 | 9/2019 | Matsuda et al. |
| 2019/0346345 A1 | 11/2019 | Scialo et al. |
| 2020/0072729 A1 | 3/2020 | Lumpkin et al. |
| 2020/0150017 A1 | 5/2020 | Bates et al. |
| 2020/0150018 A1 | 5/2020 | Shamir |
| 2020/0158603 A1 | 5/2020 | Scialo et al. |
| 2020/0240896 A1 | 7/2020 | Karasikov et al. |
| 2021/0044978 A1 | 2/2021 | Michaelis et al. |
| 2021/0063349 A1 | 3/2021 | Rodier et al. |

FOREIGN PATENT DOCUMENTS

| | | |
|---|---|---|
| EP | 1083424 | 3/2001 |
| EP | 1642113 | 4/2014 |
| JP | S57-037251 | 3/1982 |
| JP | H04188041 | 7/1992 |
| JP | H08-054388 | 2/1996 |
| JP | 2005536740 | 12/2005 |
| JP | 2011133460 | 7/2011 |
| JP | 6309896 | 4/2018 |
| WO | WO 98/50779 | 11/1998 |
| WO | WO 99/06823 | 2/1999 |
| WO | WO 2005/005965 | 1/2005 |
| WO | WO 2013/181453 | 5/2013 |
| WO | WO 2013/080209 | 6/2013 |
| WO | WO 2018/170232 | 9/2018 |
| WO | WO 2018/170257 | 9/2018 |
| WO | WO 2019/082186 | 5/2019 |
| WO | WO 2019/171044 | 9/2019 |

OTHER PUBLICATIONS

Bouhelier et al. (2003) "Near-field scattering of longitudinal fields," Applied Physics Letters 82(25): 4596-4598.

Bouhelier et al. (2003) "Near-Field Second-Harmonic Generation Induced by Local Field Enhancement," Physical Review Letters 90(1): 013903-1-013903-4.

(56) References Cited

OTHER PUBLICATIONS

Bouhelier et al. (2003) "Plasmon-coupled tip-enhanced near-field optical microscopy," J. of Microscopy 210: 220-224.
Durst et al. (1981) "Light scattering by small particles refined numerical computations," Report SFB 80/TM/195 (table of contents), 2 pp.
Durst et al. (1981) "Light scattering by small particles refined numerical computations," Report SFB 80/TM/195, English translation, 2 pp.
European Office Action, dated Jan. 22, 2009, corresponding to European Patent Application No. 04744956.6, 2 pp.
European Office Action, dated Feb. 16, 2012, corresponding to European Patent Application No. 04744956.6, 5 pp.
European Office Action, dated Sep. 24, 2013, corresponding to European Patent Application No. 04744956.6, 7 pp.
European Office Action, dated Oct. 8, 2020, corresponding to European Patent Application No. 12854152.1, 8 pp.
Friedmann et al. (1996) "Surface Analysis Using Multiple Coherent Beams," Electrical and Electronics Engineers in Israel, 537-540.
Friedmann et al. (1997) "Resolution enhancement by extrapolation of the optically measured spectrum of surface profiles," Appl. Opt. 36(8): 1747-1751.
Goldberg et al. (2002) "Immersion Lens Microscopy of Photonic Nanostructures and Quantum Dots," IEEE Journal of Selected Topics in Quantum Electronics 8(5): 1051-1059.
Hemo et al. (Jan. 1, 2011) "Scattering of singular beams by subwavelength objects," Applied Optics 50(1):33-42.
Ignatovich et al. (2006) "Real-Time and Background-Free Detection of Nanoscale Particles," Physical Review Letters 96(1): 013901-1-013901-4.
International Search Report and Written Opinion, dated Feb. 26, 2021, corresponding to International Patent Application No. PCT/US2020/061493, 12 pages.
International Search Report and Written Opinion, dated Jul. 28, 2020, corresponding to International Patent Application No. PCT/US2020/029765, 10 pages.
International Search Report and Written Opinion corresponding to PCT/IL2018/051141, dated Feb. 21, 2019, 16 pages.
International Search Report and Written Opinion corresponding to PCT/IL2012/050488, dated Mar. 21, 2013.
International Preliminary Report on Patentability corresponding to PCT/IL2012/050488, dated Jun. 3, 2014.
International Search Report and Written Opinion corresponding to PCT/IL2004/000616, dated Nov. 12, 2004.
International Preliminary Report on Patentability corresponding to PCT/IL2004/000616, dated Oct. 24, 2005.
Japanese Search Report corresponding to Application No. 2014-544046, dated Jul. 28, 2016.
Jones (1999) "Light scattering for particle characterization," Progress in Energy and Combustion Science 25(1): 1-53.
Matizen et al. (1987) "Formation of non-gaussian light beams with the aid of a spatially inhomogeneous amplitude filter," Soviet Journal of Quantum Electronics 17(7): 886-887.
Notification of Reason for Refusal corresponding to Korean Patent Application No. 10-2014-7017139, dated Nov. 22, 2018, 9 pp.
Notice of Allowance corresponding to Korean Patent Application No. 10-2014-7017139, dated Feb. 18, 2020, 3 pp.
Notice of Preliminary Rejection corresponding to Korean Patent Application No. 10-2014-7017139, dated Sep. 23, 2019.
Notification of Reasons for Refusal corresponding to Japanese Patent Application No. 2014-544046, drafted Sep. 26, 2016.
Notification of Reasons for Refusal corresponding to Japanese Patent Application No. 2014-544046, drafted Aug. 28, 2017.
Office Action (First) corresponding to Chinese Patent Application No. 201280059154.7, dated Jun. 17, 2015.
Office Action (Second) corresponding to Chinese Patent Application No. 201280059154.7, dated May 9, 2016.
Piestun et al. (1994) "Control of wave-front propagation with diffractive elements," Opt. Lett. 19(11):771-773.
Piestun et al. (1996) "Unconventional Light Distributions in three-dimensional domains," J. Mod. Opt. 43(7): 1495-1507.
Piestun et al. (1996) "Wave fields in three dimensions: Analysis and synthesis," J. Opt. Soc. Am. A 13(9): 1837-1848.
Piestun et al. (1998) "Pattern generation with extended focal depth," Appl. Opt. 37(23): 5394-5398.
Piestun (2001) "Multidimensional Synthesis of Light Fields," Optics and Photonics News 12(11): 28-32.
Piestun et al. (2002) "Synthesis of three-dimensional light-fields and applications," Proc. IEEE 90(2):222-244.
Search Opinion corresponding to European Patent Application No. 12854152.1, completed Jun. 2, 2015.
Shamir et al. (2011) "Singular beams in metrology and nanotechnology," Tribute to Joseph W. Goodman, SPIE 8122(1): 1-8.
Shamir (Jul. 2012) "Singular beams in metrology and nanotechnology," Optical Engineering 51(7): 073605-1-073605-8.
Spektor et al. (1996) "Dark beams with a constant notch," Opt. Lett. 21(7):456-458.
Supplementary Search corresponding to Chinese Patent Application No. 2012800591547, dated Apr. 28, 2016.
Weiner et al. (1998) "Improvements in Accuracy and Speed Using the Time-of-Transition Method and Dynamic Image Analysis for Particle Sizing," American Chemical Society, Chapters: 88-102.
European Extended Search Report, dated Jul. 13, 2021, corresponding to EP 18871675.7—10 pp.
"Innovative On-Line Particle Analyzer," (Jun. 2012) Innovative Particle-Monitoring Technologies Poster, 1 pp.
"Nano-particle analysis using dark laser beam sensor," (Jun. 2014) Innovative Particle-Monitoring Technologies Poster, 1 pp.
Shamir et al. (May 2013) "Novel particle sizing technology," 6 pp.

\* cited by examiner (600) Optical source (e.g. laser)
(610) Optics (e.g. steering, focusing and collection optics)
(620) Flow cell
(630) Mirror (optionally, steering mirror)
(640) Differential detector
(650) Positioner
(660) Microprocessor

PARTICLE DETECTION SYSTEMS AND METHODS FOR ON-AXIS PARTICLE DETECTION AND/OR DIFFERENTIAL DETECTION

CROSS-REFERENCE TO RELATED APPLICATIONS

This application claims the benefit of and priority to U.S. Provisional Patent Application No. 62/838,835, filed Apr. 25, 2019, which is hereby incorporated by reference in its entirety.

BACKGROUND OF INVENTION

Advancement of technologies requiring cleanroom conditions has resulted in a need for the detection and characterization of smaller and smaller particles. For example, microelectronic foundries pursue detection of particles less than 20 nm in size, and in some cases less than 10 nm in size, as they may affect the increasingly sensitive manufacturing processes and products. Similarly, the need for aseptic processing conditions for manufacturing of pharmaceuticals and biomaterials requires accurate characterization of viable and non-viable particles to address compliance standard relating to health and human safety.

Typically, these industries rely on optical particle counters for detection and characterization of small particles. The ability to detect smaller particles requires new approaches for optical particle counting such as systems employing increasing laser powers, shorter excitation wavelengths and more complex techniques such as condensation nuclei counting, which in turn can dramatically increase the cost and overall complexity of devices for detection of nanometer scale particles. These new approaches can also require more frequent calibration and maintenance to provide the necessary reliability and reproducibility.

Various optical particle counters are known in the art, for example, scattered light optical particle counters are provided in U.S. Pat. No. 7,916,293 and transmission/extinction particle counters, including those utilizing structured beams and/or interferometry are provided in U.S. Pat. Nos. 7,746,469, 9,983,113, 10,416,069, US Patent Publication Nos. 2019/0277745 and US 20170176312, and PCT international Publication WO 2019/082186. Each of these references are hereby incorporated in their entirety and specifically to illustrate particle counter system components and configurations that are useful for the detection and characterization of small particles.

It can be seen from the foregoing that there is a need in the art for systems and methods that provide enhanced optically sensing particles having small size dimensions.

SUMMARY OF THE INVENTION

Provided herein is are optical particle counter and/or analyzer systems and methods which increase the sensitivity, accuracy and throughput of an optical particle counter to allow for detection and characterization of smaller particles over large volumes of sampled fluid, for example, using on-axis detection of transmitted and/or forwarded scattered light, optionally using a probe beam comprising a structured beam such as a dark beam and optionally using a differential detection system. In some embodiments, the present systems and methods provide for detection and characterization of particles in fluids using a structured beam, such as a dark beam, incorporating optical geometries, detector configurations and signal analysis techniques allowing for an enhancement in the amount of sample fluid analyzed as a function of time, an increase in overall particle detection sensitivity for small particles (e.g., effective lateral dimensions (e.g., diameter) of 10 microns, or optionally 1 microns or optionally 500 nanometers) and/or a suppression of false positive indications.

The present systems and methods are particularly well-suited for particle measurement (e.g., detection and/or size characterization) using on-axis particle measurements by detection of transmitted and forward scattered light and/or differential detection configurations and methods. The present systems and methods are highly versatile and may be implemented using a range of particle measurement techniques including: (i) particle detection using interferometric detection of particles; (ii) particle detection using Gaussian and non-Gaussian beam, such a structured beam, dark beam, etc. (iii) particle detection using differential detection, (iv) particle detection using multipass techniques (e.g., dual pass) and/or (v) particle detection using polarization control.

In some embodiments, for example, systems and methods of the invention combine on-axis particle measurements by detection of transmitted and forward scattered light, for example using a structured beam such as a dark beam, and optionally a differential detection configuration, with optical and/or flow cell elements (e.g., translators, oscillators, piezoelectric elements, etc.) providing for rapid translation (e.g., faster than the average velocity of the particle as it passes through the beam) of the flow cell along a lateral direction (e.g., along an axis orthogonal to the beam axis) and/or along the z-axis (e.g., along an axis along the beam axis between the optical source and detector) to achieve greater sampled volume of fluid per unit time relative to systems not employing translation. In an embodiment, for example, the laser source or flow cell is translated, for example via a translator or oscillator, to as to increase the volume of sample fluid analyzed per unit time via particle detection using a structured beam such as a dark beam. In an embodiment, for example, the flow cell is translated at an average translation velocity that is at least two times faster than the average particle velocity as it travels through the beam and optionally for some applications the flow cell is translated at an average translation velocity that is 5-100× faster than the average particle velocity as it travels through the beam. In some embodiments, for example, the flow velocity of the fluid containing particle is selected over the range of 5-300 cm/sec. In some embodiments, for example, the flow cell is translated at an average translation velocity greater than or equal to 25 cm/sec. In an embodiment, the translator provides translation of the flow cell along a distance selected from the range of 10-1000 microns. In some embodiments, the translator undergoes periodic translation at a frequency selected from the range of 100 kHz-100 MHz. Translation may be a periodic translation in one direction or more than one direction, including an oscillation and/or may a linear translation or a non-linear translation. In some embodiments, for example, the oscillator oscillates at a frequency high enough such that the flow cell completes its displacement in less time than is required for the particles to pass through the area of high radiation density. In some embodiments, the translator is an oscillator that oscillates at a frequency selected from the range of 100 kHz 100 MHz.

In some embodiments, for example, systems and methods of the invention combine on-axis particle measurements by detection of transmitted and forward scattered light, for example using a structured beam such as a dark beam, and optionally a differential detection configuration, with use of pixelated photodetector(s) having pixel areas corresponding to (e.g., within a factor of 1.5 and optionally a factor of 1.2) spatial extent of the particle beam interaction signal within the beam, thereby providing an enhancement for detection of more particle transitions leading to an improvement of the sample volume analyzed per unit time. In some embodiments, such pixelated detection configurations allow for breaking out of particle signal image from the surrounding "larger" beam image. In some embodiments, the systems and methods incorporate a pixelated photodetector with one or more rows of elements so as to provide for efficient differential detection between at least two elements. Pixel widths each independently selected from the range of 10 to 500 microns are useful in certain embodiments and optionally for some applications each independently selected from the range of 50-100 microns.

In some embodiments, systems and methods of the invention combine on-axis particle measurements by detection of transmitted and forward scattered light, optionally using a differential detection configuration and/or using a structured beam such as a dark beam, with additional off-axis detection of scattered light or fluorescence for distinguishing between biological (e.g. microbial particles) and non-biological particles. Biological particles, such as microbes, are composed primarily of water, so they have a very low index of refraction contrast with water and hence scatter very little. Accordingly, biological particles generate a small side scattering signal or are not detected using side scattering. Biological particles do create a strong response signal in the present methods and systems using on-axis detection of transmitted light and forward scattered light, for example using structure beam and/or differential detection techniques. In some methods and systems of the invention, observation of (or comparison of) a large on-axis signal compared to the side scatter signal or observation of a signal at the on-axis detector without a corresponding signal at the side scatter detector is used to characterize a particle as a biological particle, such as a microbial particle. Alternatively, in some methods and systems of the invention, observation of (or comparison of) comparable on-axis signal and side scatter signal or observation of both signals at the on-axis detector and at the side scatter detector is used to characterize a particle as a non-biological particle.

In some embodiments, systems and methods of the invention use on-axis particle detection by detection of transmitted and forward scattered light using a structured beam, such as a dark beam, to characterize the refractive index of the particle, for example, relative to (e.g., greater or less than) the refractive index of the media the particle is in (e.g., the composition of the fluid flow). This aspect allows for determining attributes of the composition of the particle, for example, providing a means for distinguishing between metallic and non-metallic particles based on refractive index. In systems incorporating a differential detection configuration, for example, reliable and repeatable flipping of the "classical" particle signal may be used for accurately distinguishing between metallic and non-metallic particles. In some embodiments, for example, difference in the refractive index of the particle relative to the refractive index of the carrier fluid results in a signal that may be used to characterize the optical properties and composition of the particles.

If the analyzed particle has a refractive index higher than the refractive index of the carrier fluid, for example as in the case of polystyrene latex (PSL) particles in water media, a bright fringe is observed at the top of the beam and a dark fringe is observed at the bottom of the beam for conditions wherein the particle enters the beam in the flow cell. For example, when the particle enters the beam from the bottom. On the other hand, if the analyzed particle has a refractive index lower than the refractive index of the carrier fluid, as in the case of gold nanoparticles in water media, the fringe pattern is reversed for conditions of wherein the particle enters the beam in the flow cell, such as when the particle enters the beam from the bottom, such that a dark fringe is observed at the top of the beam and a bright fringe is observed at the bottom of the beam. Therefore, by observing and characterizing the sequence, order and/or positioning of the bright fringe and the dark fringe during the particle interaction with the beam the refractive index relative to the carrier (e.g., greater than or less than) of the particles can be characterized and, therefore, information relating to composition of the particles can also be inferred. Differential detection provides an efficient and accurate means of characterizing the sequence, order and/or position of dark fringe and bright fringe in the present systems and techniques as a function of time during the trajectory of the particle through the beam, for example, at times (i) when the particle first enters the beam (e.g., from the bottom), (ii) when the particle passes through the beam waist and (iii) when the particle exists the beam.

In some embodiments, for example, systems and methods of the invention combine on-axis particle measurements by detection of transmitted and forward scattered light, optionally using a differential detection configuration and/or using a structured beam such as a dark beam, with an adjuster to balance the differential detector, such as first and second detector regions corresponding to a top pixel or top subset of pixels and a bottom pixel or subset of pixels, across the beam, for example, by moving the detector using a positioner and/or actuating a mirror before the detector to balance signal between first and second detector regions corresponding to a top pixel or top subset of pixels and a bottom pixel or subset of pixels. In an embodiment of this differential detection aspect, adjustment of the detector and/or the beam position on the detector using an adjustor provides for enhanced noise cancellation, particularly for circumstances wherein the position of the beam is susceptible to vibration and acoustical inputs, for example, when the system is not isolated from source of such vibration and acoustical input. In an embodiment of this differential detection aspect, a portion of the beam is provided to an imager or multiple detector (e.g., quad detector) to provide feedback for beam power density, spot size in flow cell. In some embodiments, the adjustor is operated via closed loop control, for example, by periodic measurement of the noise amplitude of the differential signal when particles are not present and active adjustment of the differential detector position and/or beam position on the differential detector so as to the noise amplitude of the differential signal.

In some embodiments, the present systems and methods include one or more adjustors to ensure that the laser beam intensity is balanced between the upper half and the lower half of a differential detector, for example, so as to reduce noise and enhance signal In an embodiment, for example, a closed loop system is employed that that determines and analyzes the noise amplitude of the differential signal when particles are not present. In an embodiment, a steering mirror is used to adjust the beam position on the detector to minimize noise levels of the differential signal. This condition occurs when the beam power is uniformly split between the upper and lower elements, such as uniform to within 20% and optionally uniform to within 10%. Similarly, such control can also be achieved through translating the detector position and rotating the detector to align the beam and detector axes.

In some embodiments, for example, systems and methods of the invention combine on-axis particle measurements by detection of transmitted and forward scattered light, for example using a structured beam such as a dark beam, with an optical modulator with a lock-in amplifier; in conjunction with cooled detector for improved signal-to-noise ratio.

In some embodiments, for example, systems and methods of the invention combine on-axis particle measurements by detection of transmitted and forward scattered light, for example using a structured beam such as a dark beam, and optionally a differential detection configuration, with a collimating or imaging the beam onto the photodetector.

In some embodiments, for example, systems and methods of the invention combine on-axis particle measurements by detection of transmitted and forward scattered light, for example using a structured beam such as a dark beam, and optionally a differential detection configuration, with a knife edge prism to split the beam onto separate photodetectors In an aspect, a particle detection system comprises a flow cell for flowing a fluid containing particles; an optical source for generating one or more coherent beams of electromagnetic radiation; a beam shaping system for passing the one or more coherent beams of electromagnetic radiation through the flow cell, thereby generating electromagnetic radiation scattered by the particles; at least one optical detector array for receiving electromagnetic radiation from the flow cell, wherein the optical source, beam shaping system and optical detector array are configured to allow for detection of the particles. In an embodiment, the optical source, beam shaping system and optical detector array are configured to provide interferometric detection of particles. In an embodiment, the optical source, beam shaping system and optical detector array are configured to provide structured beam detection of the particles by passing a structured probe beam of coherent electromagnetic radiation through the flow cell. In an embodiment, the optical source and optical detector array are configured to provide structured dark beam detection of the particles, such as a structured dark beam characterized by a spatial intensity profile having region of attenuated intensity, such as a centerline decrease in intensity.

In an embodiment, the optical detector array is positioned in optical communication with the flow cell for receiving incident electromagnetic radiation transmitted through the flow cell and electromagnetic radiation scattered by the particle, for example, wherein the electromagnetic radiation scattered by the particle comprises forward scattered electromagnetic radiation. In an embodiment, the incident electromagnetic radiation transmitted through the flow cell and the electromagnetic radiation scattered by the particle undergo constructive and/or destructive optical interference, for example, thereby generating one or more diffraction patterns. In an embodiment, the optical detector array is provided at a scattering angle that is within 5 degrees of zero degrees relative to the optical axis of the incident beam, optionally for some applications at a scattering angle that is within 1 degree of zero degrees relative to the optical axis of the incident beam, optionally for some applications at a scattering angle that is within 0.5 degree of zero degrees relative to the optical axis of the incident beam, and optionally for some applications at a scattering angle that is within 0.1 degree of zero degrees relative to the optical axis of the incident beam. In an embodiment, the optical detector array is provided in optical communication with the flow cell for detecting the interaction of the particle and the electromagnetic radiation scattered by the particle with the illuminating wave front.

In an embodiment, the source provides a coherent incident beam to the flow cell, such as a Gaussian incident beam. System and methods of the invention are also well-adapted for structured beam detection using a structured beam such as dark beam. In an embodiment, the optical source comprises one or more shaping and/or combining optical elements for generating the one or more coherent beams of electromagnetic radiation. In an embodiment, the one or more shaping and/or combining optical elements are diffractive elements, polarizing elements, intensity modulating elements, phase modulating elements or any combination of these. In an embodiment, the one or more coherent beams of electromagnetic radiation comprises a structured, non-Gaussian beam. In an embodiment, the one or more coherent beams of electromagnetic radiation comprises a dark beam. In an embodiment, the one or more coherent beams of electromagnetic radiation comprises a beam characterized by one or more line singularities. In an embodiment, the one or more coherent beams of electromagnetic radiation comprises an anamorphic beam. In an embodiment, the one or more coherent beams of electromagnetic radiation comprises an anamorphic beam in a top hat configuration.

The systems and methods are compatible with a wide range of detectors and detector configurations. In an embodiment, forward looking on axis detector pair(s) are provided, for example at a scattering angle that is within 20 degrees of zero degrees relative to the optical axis of the incident beam, optionally for some applications a scattering angle that is within 5 degrees of zero degrees relative to the optical axis of the incident beam, optionally for some applications at a scattering angle that is within 1 degree of zero degrees relative to the optical axis of the incident beam, optionally for some applications at a scattering angle that is within 0.5 degree of zero degrees relative to the optical axis of the incident beam, and optionally for some applications at a scattering angle that is within 0.1 degree of zero degrees relative to the optical axis of the incident beam. Differential detection may be used in the present systems and methods to provide a significant reduction of noise, for example by using a detector configuration with first and second active regions aligned to receive portions of the incident beam, optionally wherein the beam power is uniformly split between the first and second active regions.

The systems and methods of the invention provide detection of particles in flowing fluids, including detection, counting and sizing of single particles in a fluid flow. In an embodiment, the fluid is a liquid or a gas. In an embodiment, the system is for detection of particles in liquid chemicals. In an embodiment, the system is for detection of particles in ultrapure water. In an embodiment, the system is for detection of particles in high pressure gases. In an embodiment, the system is for detection of particles in air. In an embodiment, the system is for detection of particles on surfaces.

In some embodiments, the present systems and methods are for analyzing large sample volumes per unit time by: (i) adjusting the depth of focus of the beam of electromagnetic radiation, (ii) increasing the effective scanning area of the beam and/or (iii) increasing the signal-to-noise ratio generated by the detector elements of the particle counter. The described systems and methods may allow for detection of nanoscale particles (e.g., less than 50 nm, optionally less than 20 nm, optionally less than 10 nm), for example using lower laser power requirements than in conventional optical particle counters.

One method of increasing the effective scanning area of a beam or laser of an optical particle counter is to rapidly translate the beam through the target flow cell, such that the beam effectively scans a larger cross-sectional area or volume of the fluid being analyzed. The beam may be translated by various methods, including oscillating the flow cell, the optical focusing system or the electromagnetic source. The oscillation may be at a higher frequency than the transit time of particles within the fluid (based on the flow rate of the fluid in the flow cell) reducing or elimination the possibility that particles could be missed by beam due to the movement. The oscillation may be in the x-direction (laterally with regard to the beam propagating in the z-direction) in the y-direction (vertically with regard to the beam propagating in the z-direction), and/or in the z-direction (along the beam path). Oscillators may be various acoustic, electric or mechanical devices known in the art, for example, a piezoelectric device.

In an aspect, provided is an system for detecting particles in a fluid, the system comprising: i) a flow cell for flowing a fluid containing particles along a flow direction through a beam of electromagnetic radiation, ii) an optical source in optical communication with the flow cell for providing the beam of electromagnetic radiation, optionally a structured beam such as a dark beam; iii) a focusing system in optical communication with the optical source for focusing the beam of electromagnetic radiation to generate an area of high radiation density, such as a focused beam region, within the flow cell; iv) an translator, such as an oscillator, operably connected to the flow cell for translating the flow cell closer to and further away from (i.e. in the z-direction) the focusing system such that the area of high radiation density changes position in the flow cell, and v) an optical collection system for collecting and directing at least a portion of electromagnetic radiation onto a photodetector, wherein optionally the photodetector is positioned in optical communication with the flow cell for receiving incident electromagnetic radiation transmitted through the flow cell and electromagnetic radiation forwarded scattered by the particle; wherein the photodetector produces an electric signal characteristic of the number and/or size of the particles detected; wherein the change in position of the area of high radiation density allows for characterization of the particles in a larger cross sectional area of the flow cell and/or in a larger volume of fluid. In some embodiments, for example, the optical detector array is provided at a scattering angle that is within 5 degrees of zero degrees relative to the optical axis of the incident beam, and optionally provided at a scattering angle that is within 0.5 degrees of zero degrees relative to the optical axis of the incident beam.

In an aspect, provided is an system for detecting particles in a fluid, the system comprising: i) a flow cell for flowing a fluid containing particles along a flow direction through a beam of electromagnetic radiation, ii) an optical source in optical communication with the flow cell for providing the beam of electromagnetic radiation, optionally a structured beam such as a dark beam; iii) a focusing system in optical communication with the optical source for focusing the beam of electromagnetic radiation to generate an area of high radiation density, such as a focused beam region, within the flow cell; iv) a translator, such as an oscillator, operably connected to the flow cell for translating the flow cell laterally (e.g. in a direction orthogonal to the probe beam axis) across the beam of electromagnetic radiation such that the area of high radiation density changes position in the flow cell, and v) an optical collection system for collecting and directing at least a portion of electromagnetic radiation onto a photodetector, wherein optionally the photodetector is positioned in optical communication with the flow cell for receiving incident electromagnetic radiation transmitted through the flow cell and electromagnetic radiation forwarded scattered by the particle; wherein the photodetector produces an electric signal characteristic of the number and/or size of the particles detected; wherein the change in position of the area of high radiation density allows for characterization of the particles in a larger cross sectional area of the flow cell and/or in a larger volume of fluid. In some embodiments, for example, the optical detector array is provided at a scattering angle that is within 5 degrees of zero degrees relative to the optical axis of the incident beam, and optionally provided at a scattering angle that is within 0.5 degrees of zero degrees relative to the optical axis of the incident beam, and optionally for some applications, the photodetector is a differential detection system.

In an aspect, provided is an system for detecting particles in a fluid, the system comprising: i) a flow cell for flowing a fluid containing particles along a flow direction through a beam of electromagnetic radiation, ii) an optical source in optical communication with the flow cell for providing the beam of electromagnetic radiation, optionally a structured beam such as a dark beam; iii) a focusing system in optical communication with the optical source for focusing the beam of electromagnetic radiation to generate an area of high radiation density, such as a focused beam region within the flow cell; iv) a first translator, such as an oscillator, operably connected to the flow cell for translating the flow cell closer to and further away from the focusing system such that the area of high radiation density changes depth in the flow cell, v) a second translator, such as an oscillator, operably connected to the flow cell for translating the flow cell laterally across the beam of electromagnetic radiation such that the area of high radiation density changes lateral position in the flow cell, and vi) an optical collection system for collecting and directing at least a portion of electromagnetic radiation onto a photodetector, wherein optionally the photodetector is positioned in optical communication with the flow cell for receiving incident electromagnetic radiation transmitted through the flow cell and electromagnetic radiation forwarded scattered by the particle; wherein the photodetector produces an electric signal characteristic of the number and/or size of the particles detected; wherein the first translator and the second translator operate independently and the change in depth and lateral position of the area of high radiation density allows for characterization of the particles in a larger volume of the flow cell. In some embodiments, for example, the optical detector array is provided at a scattering angle that is within 5 degrees of zero degrees relative to the optical axis of the incident beam, and optionally provided at a scattering angle that is within 0.5 degrees of zero degrees relative to the optical axis of the incident beam, and optionally for some applications, the photodetector is a differential detection system.

The translator, such as an oscillator, may translate the flow cell along a periodic displacement or oscillate at a frequency higher than the time required for the particles to pass through the area of high radiation density.

Adjusting the profile of the beam at the waist (the narrowest point of the propagating beam and therefore the highest in energy density) may also be used to increase the cross-sectional area of the flow cell being analyzed. For example, by enlarging the beam waist in the lateral direction (x) a higher cross-sectional area or volume may pass through the waist, which typically provides the necessary energy density to detect particles in the fluid. The energy density or laser power will decrease as the area is enlarged, however by reducing the beam waist in the vertical direction (y), a high energy density may be maintained.

In an aspect, provided is an system for detecting particles in a fluid, the system comprising: i) a flow cell for flowing a fluid containing particles along a flow direction through a beam of electromagnetic radiation, ii) an optical source in optical communication with the flow cell for providing the beam of electromagnetic radiation, optionally a structured beam such as a dark beam; iii) a focusing system in optical communication with the optical source for focusing the beam of electromagnetic radiation into the flow cell, wherein the focusing system generates a double waist of the electromagnetic beam in both the x-direction and the y-direction on a transverse plane within the flow cell; wherein the double waist has a greater length in the in the x-direction than in the y-direction; iv) an optical collection system for collecting and directing at least a portion of electromagnetic radiation onto a photodetector, wherein optionally the photodetector is positioned in optical communication with the flow cell for receiving incident electromagnetic radiation transmitted through the flow cell and electromagnetic radiation forwarded scattered by the particle; wherein the photodetector produces an electric signal characteristic of the number and/or size of the particles detected. The double waist has a length in the x-direction greater than or equal to 2 times, 10 times, 20 times, 50 times, or optionally, 100 times the length in the y-direction. In some embodiments, for example, the optical detector array is provided at a scattering angle that is within 5 degrees of zero degrees relative to the optical axis of the incident beam, and optionally provided at a scattering angle that is within 0.5 degrees of zero degrees relative to the optical axis of the incident beam, and optionally for some applications, the photodetector is a differential detection system In an aspect, provided is an system for detecting particles in a fluid, the system comprising: i) a flow cell for flowing a fluid containing particles along a flow direction through a beam of electromagnetic radiation, ii) an optical source in optical communication with the flow cell for providing the beam of electromagnetic radiation, optionally a structured beam such as a dark beam; iii) a focusing system in optical communication with the optical source for focusing the beam of electromagnetic radiation to generate an area of high radiation density, such as a focused beam region, within the flow cell; and iv) an optical collection system for collecting and directing at least a portion of electromagnetic radiation onto a pixelated photodetector, wherein optionally the pixelated photodetector is positioned in optical communication with the flow cell for receiving incident electromagnetic radiation transmitted through the flow cell and electromagnetic radiation forwarded scattered by the particle, wherein each pixel of the pixelated photodetector has an area corresponding to a spatial extent of the particle beam interaction signal within the beam; wherein the pixelated photodetector produces an electric signal characteristic of the number and/or size of the particles detected. In some embodiments, an area corresponding to a spatial extent of the particle beam interaction signal within the beam refers to an area that is 75% matched to the spatial extent of the particle beam interaction signal, optionally for some applications an area that is 90% matched to the spatial extent of the particle beam interaction signal, and optionally for some applications an area that is 95% matched to the spatial extent of the particle beam interaction signal. In some embodiments, for example, the optical detector array is provided at a scattering angle that is within 5 degrees of zero degrees relative to the optical axis of the incident beam, and optionally provided at a scattering angle that is within 0.5 degrees of zero degrees relative to the optical axis of the incident beam, and optionally for some applications, the photodetector is a differential detection system.

In an aspect, provided is an system for detecting particles in a fluid, the system comprising: i) a flow cell for flowing a fluid containing particles along a flow direction through a beam of electromagnetic radiation, ii) an optical source in optical communication with the flow cell for providing the beam of electromagnetic radiation, optionally a structured beam such as a dark beam; iii) a focusing system in optical communication with the optical source for focusing the beam of electromagnetic radiation to generate an area of high radiation density, such as a focused beam region, within the flow cell; iv) and an optical collection system for collecting and directing at least a portion of electromagnetic radiation onto a pixelated photodetector, wherein optionally the photodetector is positioned in optical communication with the flow cell for receiving incident electromagnetic radiation transmitted through the flow cell and electromagnetic radiation forwarded scattered by the particle, wherein the optical collection system recollimates or focuses the beam of electromagnetic radiation; wherein each pixel of the pixelated photodetector has an area corresponding to a spatial extent of the particle beam interaction signal within the beam; wherein the photodetector produces an electric signal characteristic of the number and/or size of the particles detected. In some embodiments, for example, the optical detector array is provided at a scattering angle that is within 5 degrees of zero degrees relative to the optical axis of the incident beam, and optionally provided at a scattering angle that is within 0.5 degrees of zero degrees relative to the optical axis of the incident beam.

The image of the particle-beam interaction signal is important in the slow axis (long axis) of the beam at the detector. The vertical extent of the signal in the beam is less important for some methods and applications. The signal will transition across the upper and lower detector elements as the particle transits the beam. To maximize signal-to-noise, the spatial extent of the particle-beam interaction signal in the slow axis may be predominantly located on a single pair of detector elements. Dispersing the particle-beam interaction signal across multiple pairs of detectors will reduce the signal-to-noise of the measurement.

In some embodiments, the pixelated photodetector characterizes particles based on one or more horizontal rows of pixels (e.g., distinguishes actual particles from noise), for example, a horizontal row having a height of 100 pixels, 20 pixels, 10 pixels, 5 pixels, 3 pixels, 2 pixels or optionally 1 pixels. For differential detection, two or more rows of horizontal pixels may be used.

The systems and methods described herein may also be used to determine or estimate the refractive index of a particle, for example, relative to the refractive index of the fluid media. The system may distinguish biological particles, such as cells and microbial particles, from non-biological particles using a side scatter detector. The refractive index of biological particles tends to be relatively similar to the fluid being analyzed, because cells and cell fragments contain a large percentage of water. Thus, by including a side scatter detector, a detection event that triggers both the primary photodetector and the side scatter detector will correspond to a non-biological particle as the radiation will be refracted or scattered into the side detector. However, a detection event that triggers the primary detector but does not trigger the side scatter will correspond to a biological particle, because the radiation will not be refracted to the extent necessary to direct it towards the side detector.

In an aspect, provided is an system for detecting particles in a fluid, the system comprising: i) a flow cell for flowing a fluid containing particles along a flow direction through a beam of electromagnetic radiation, ii) an optical source in optical communication with the flow cell for providing the beam of electromagnetic radiation, optionally a structured beam such as a dark beam; iii) a focusing system in optical communication with the optical source for focusing the beam of electromagnetic radiation into the flow cell; iv) an optical collection system for collecting and directing at least a portion of electromagnetic radiation onto a photodetector, wherein optionally the photodetector is positioned in optical communication with the flow cell for receiving incident electromagnetic radiation transmitted through the flow cell and electromagnetic radiation forwarded scattered by the particle; iv) a side scatter detector in optical communication with the flow cell; wherein the photodetector produces an electric signal characteristic of the number and/or size of the particles detected; wherein the side scatter detector allows the system to characterize a particle a biological or non-biological due to the difference of refractive index of the fluid and the particle. In some embodiments, for example, the optical detector array is provided at a scattering angle that is within 5 degrees of zero degrees relative to the optical axis of the incident beam, and optionally provided at a scattering angle that is within 0.5 degrees of zero degrees relative to the optical axis of the incident beam.

The systems using differential detection as described herein may also characterize the refractive index of a particle as being higher or lower than the refractive index of the fluid. This is important, as metal particles will typically have a refractive index less than that of common fluids, while non-metals will have a refractive index higher than the fluid. Most metals are conductive and conductive materials are more harmful in many stages of the semiconductor manufacturing process, thus, distinguishing metals help identify more dangerous particles.

In an aspect, provided is an system for detecting particles in a fluid, the system comprising: i) a flow cell for flowing a liquid containing particles along a flow direction through a beam of electromagnetic radiation, ii) an optical source in optical communication with the flow cell for providing the beam of electromagnetic radiation, optionally a structured beam such as a dark beam; iii) a focusing system in optical communication with the optical source for focusing the beam of electromagnetic radiation into the flow cell; iv) an optical collection system for collecting and directing at least a portion of electromagnetic radiation onto a photodetector comprising at least two detector elements, wherein optionally the photodetector is positioned in optical communication with the flow cell for receiving incident electromagnetic radiation transmitted through the flow cell and electromagnetic radiation forwarded scattered by the particle; wherein each detector element produces an electric signal characteristic of the number and/or size of the particles detected and the photodetector characterizes the particles based on a differential signal generated from each detector element signal; wherein the detector characterizes the particles as having a lower or higher refractive index than the fluid. The detector may characterize the particle as a metal or a non-metal. In some embodiments, for example, the optical detector array is provided at a scattering angle that is within 5 degrees of zero degrees relative to the optical axis of the incident beam, and optionally provided at a scattering angle that is within 0.5 degrees of zero degrees relative to the optical axis of the incident beam.

In an aspect, provided is an system for detecting particles in a fluid, the system comprising: i) a flow cell for flowing a fluid containing particles along a flow direction through a beam of electromagnetic radiation, ii) an optical source in optical communication with the flow cell for providing the beam of electromagnetic radiation, optionally a structured beam such as a dark beam; iii) a focusing system in optical communication with the optical source for focusing the beam of electromagnetic radiation into the flow cell; iv) an optical collection system for collecting and directing at least a portion of electromagnetic radiation onto a photodetector, wherein the photodetector comprises at least two detection elements, wherein optionally the photodetector is positioned in optical communication with the flow cell for receiving incident electromagnetic radiation transmitted through the flow cell and electromagnetic radiation forwarded scattered by the particle; and v) an adjuster operably connected to the photodetector or to the focusing system; wherein the adjuster is moves the photodetector or alters the focusing system such that the intensity of the electromagnetic beam is distributed in one direction evenly over each of the detection elements of the photodetector; wherein the photodetector produces an electric signal characteristic of the number and/or size of the particles detected. The beam may be distributed vertically, horizontally or both. In some embodiments, for example, the optical detector array is provided at a scattering angle that is within 5 degrees of zero degrees relative to the optical axis of the incident beam, and optionally provided at a scattering angle that is within 0.5 degrees of zero degrees relative to the optical axis of the incident beam.

In an aspect, a system for detecting particles in a fluid is provided, the system comprising: (i) a flow cell for flowing a fluid containing particles along a flow direction through a beam of electromagnetic radiation, (ii) an optical source in optical communication with the flow cell for providing the beam of electromagnetic radiation; (iii) a focusing system in optical communication with the optical source for focusing the beam of electromagnetic radiation to generate an area of high radiation density within the flow cell; and (iv) an optical collection system for collecting and directing at least a portion of electromagnetic radiation onto a pixelated photodetector, wherein for at least a portion of the pixels of the pixelated photodetector each pixel has an area sufficient to collect the majority of the energy of the particle-beam interaction signal; (v) wherein the pixelated photodetector produces an electric signal characteristic of the number and/or size of the particles detected.

In an aspect, a system for detecting particles in a fluid is provided, the system comprising: (i) a flow chamber for flowing a fluid containing particles along a flow direction through a beam of electromagnetic radiation, (ii) an optical source in optical communication with the flow chamber for providing the beam of electromagnetic radiation; (iii) a focusing system in optical communication with the optical source for focusing the beam of electromagnetic radiation to generate an area of high radiation density within the flow chamber; and (iv) an optical collection system for collecting and directing at least a portion of electromagnetic radiation onto a pixelated photodetector, wherein for at least a portion of the pixels of the pixelated photodetector each pixel has an area corresponding to a spatial extent of the particle beam interaction signal within the beam; wherein the pixelated photodetector produces an electric signal characteristic of the number and/or size of the particles detected.

In an aspect, a system for detecting particles in a fluid is provided, the system comprising: (i) a flow cell for flowing a fluid containing particles along a flow direction through a beam of electromagnetic radiation, (ii) an optical source in optical communication with the flow cell for providing the beam of electromagnetic radiation; (iii) a focusing system in optical communication with the optical source for focusing the beam of electromagnetic radiation to generate an area of high radiation density within the flow cell; and (iv) an optical collection system for collecting and directing at least a portion of electromagnetic radiation onto a pixelated photodetector, wherein the optical collection system recollimates or focuses the beam of electromagnetic radiation; wherein for at least portion of the pixels of the pixelated photodetector each pixel has an area corresponding to a spatial extent of the particle beam interaction signal within the beam; wherein the photodetector produces an electric signal characteristic of the number and/or size of the particles detected xx The adjuster may be operably connected to the photodetector and translates, moves, rotates or tilts the photodetector. The adjuster may be a mirror or a lens operably connected to the focusing system and adjusts a path of the beam of electromagnetic radiation. The adjuster may also be configured to provide optical beam power density to the flow cell or to the photodetector, adjust the beam spot size, adjust an area of high radiation density in the flow cell or any combination thereof. The systems described herein may further comprise an imager, wherein the beam of electromagnetic radiation may be directed toward the imager and the imager provides feedback to the adjuster in a closed loop on optimal optical beam power density, optimal beam spot size, optimal area of high radiation density in the flow cell or any combination thereof.

The beam of electromagnetic radiation may be a Gaussian beam, a structured non-Gaussian beam, a structured dark beam or an anamorphic beam in a top hat configuration.

System of the invention include optical particle counters, optical particle analyzers and optical particle size classifiers.

The photodetector may comprise at least two detector elements and characterizes the particles based on a differential signal from individual signals from each detector element indicative of the particles. The described systems may comprise an analyzer for generating and/or analyzing the differential signal. The focusing system may direct the beam of electromagnetic radiation through the flow cell at least twice and the particles in the flow cell interact with a different portion of the beam on each individual pass through the flow cell. The analyzer may analyze the differential signal in the time domain. The focusing system may comprise a half wave plate, a quarter wave plate or both for altering a polarization state of the beam.

The described systems may further comprise a modulator in optical communication with the optical source to modulate the beam of electromagnetic radiation, for example, a modulator such as a chopper. The modulator may have a frequency of modulation greater than or equal to 50 kHz, 100 kHz, 200 kHz or optionally, 500 kHz. The photodetector may have a cooling system to reduce dark current, thereby increasing signal-to-noise ratio. The described systems may further comprise a lock-in amplifier, wherein the lock-in amplifier is bandwidth tuned to the frequency of the modulator.

The focusing system may comprise one or more diffractive optical elements. The diffractive optical element may elongate a depth of focus of the beam of electromagnetic radiation thereby generating a longer beam waist and a larger area of high radiation density within the flow cell.

The focusing system may comprise a varifocal lens for modifying a depth of focus or an area of high radiation density in the flow cell, for example, an ultra-fast varifocal lens.

The various aspects described herein may also be used in combination with one another, and the various possible combinations are specifically disclosed herein.

Various methods of use of the described systems for the detection of particles in a fluid are also specifically disclosed herein.

The invention also provides methods for detecting, counting and/or characterizing the size of particles in a fluid using a probe beam of electromagnetic radiation, such as a structured beam including a dark beam. In some embodiments, the methods comprise detection of transmitted and forward scattered light from a flow cell having the fluid with the particles. In some embodiments, the methods comprise detection of transmitted and forward scattered light from a flow cell using a differential detection configuration, such as differential detection using a segmented detector comprising one or more pixel pairs, and/or using a structured beam such as a dark beam. In some embodiments, the methods comprise detection of transmitted and forward scattered light from a flow cell having the fluid with the particles, optionally with additional off-axis detection of scattered light, for example using scatter light collection options and scattered light detector. The invention also provides methods for detecting, counting and/or characterizing the size of particles in a fluid by detection of transmitted and forward scattered light optionally providing for rapid translation (e.g., faster than the average velocity of the particle as it passes through the beam) of the flow cell laterally and/or along the z-axis (e.g., along the beam axis between the light source and detector) to achieve greater sampled volume of fluid per unit time relative to systems not employing translation. The invention also provides methods for detecting, counting and/or characterizing the size of particles in a fluid by detection of transmitted and forward scattered light optionally using pixelated photodetector(s) having pixel areas corresponding to (e.g., within a factor of 1.5 and optionally a factor of 1.2) the spatial extent of the particle beam interaction signal within the beam, thereby providing an enhancement for detection of more particle transitions leading to an improvement of the sample volume analyzed per unit time. The invention also provides methods for detecting, counting and/or characterizing the size of particles in a fluid by detection of transmitted and forward scattered light optionally including additional off-axis detection of scattered light or fluorescence for distinguishing between biological and non-biological particles, for example using scatter light collection options and scattered light detector.

In an embodiment, a method for detecting, counting and/or characterizing the size of particles in a fluid comprises the steps: (i) providing a flow of the fluid containing particles, for example in a flow cell; (ii) generating a beam of electromagnetic radiation using an optical source, and optionally one or more beam steering and/or shaping components, such as a structured beam or dark beam; (iii) passing the beam of electromagnetic radiation through the flow cell, for example using a beam steering and/or shaping optical system such as a focusing system, thereby generating electromagnetic radiation transmitted by the flow cell and electromagnetic radiation forward scattered by a particle(s) in the flow cell; (iv) directing at least a portion of electromagnetic radiation transmitted by the flow cell and electromagnetic radiation forward scattered by the particle from the flow cell onto an optical detector array, such as a segmented optical detector array comprising one or more pixel pairs' (v) detecting portion of electromagnetic radiation transmitted by the flow cell and electromagnetic radiation forward scattered by the particle, thereby generating one or more signals, and (vi) analyzing the one or more signal, for example using hardware or a processor, such as generating and analyzing a differential signal, thereby detecting and/or analyzing the particles. In an embodiment of the methods the optical detector array is positioned in optical communication with the flow cell for receiving incident electromagnetic radiation transmitted through the flow cell and electromagnetic radiation scattered by the particle, for example, wherein the electromagnetic radiation scattered by the particle comprises forward scattered electromagnetic radiation. In an embodiment of the methods, the incident electromagnetic radiation transmitted through the flow cell and the electromagnetic radiation scattered by the particle undergo constructive and/or destructive optical interference. In an embodiment of the methods the optical detector array is provided at a scattering angle that is within 5 degrees of zero degrees relative to the optical axis of the incident beam, optionally for some applications at a scattering angle that is within 1 degree of zero degrees relative to the optical axis of the incident beam, optionally for some applications at a scattering angle that is within 0.5 degree of zero degrees relative to the optical axis of the incident beam, and optionally for some applications at a scattering angle that is within 0.1 degree of zero degrees relative to the optical axis of the incident beam. In an embodiment of the methods, the optical detector array is provided in optical communication with the flow cell for detecting the interaction of the particle and the electromagnetic radiation scattered by the particle with the illuminating wave front.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 1A shows a single pass optical geometry and FIG. 1B shows a dual pass optical geometry.

DETAILED DESCRIPTION OF THE INVENTION

Figure 1A:
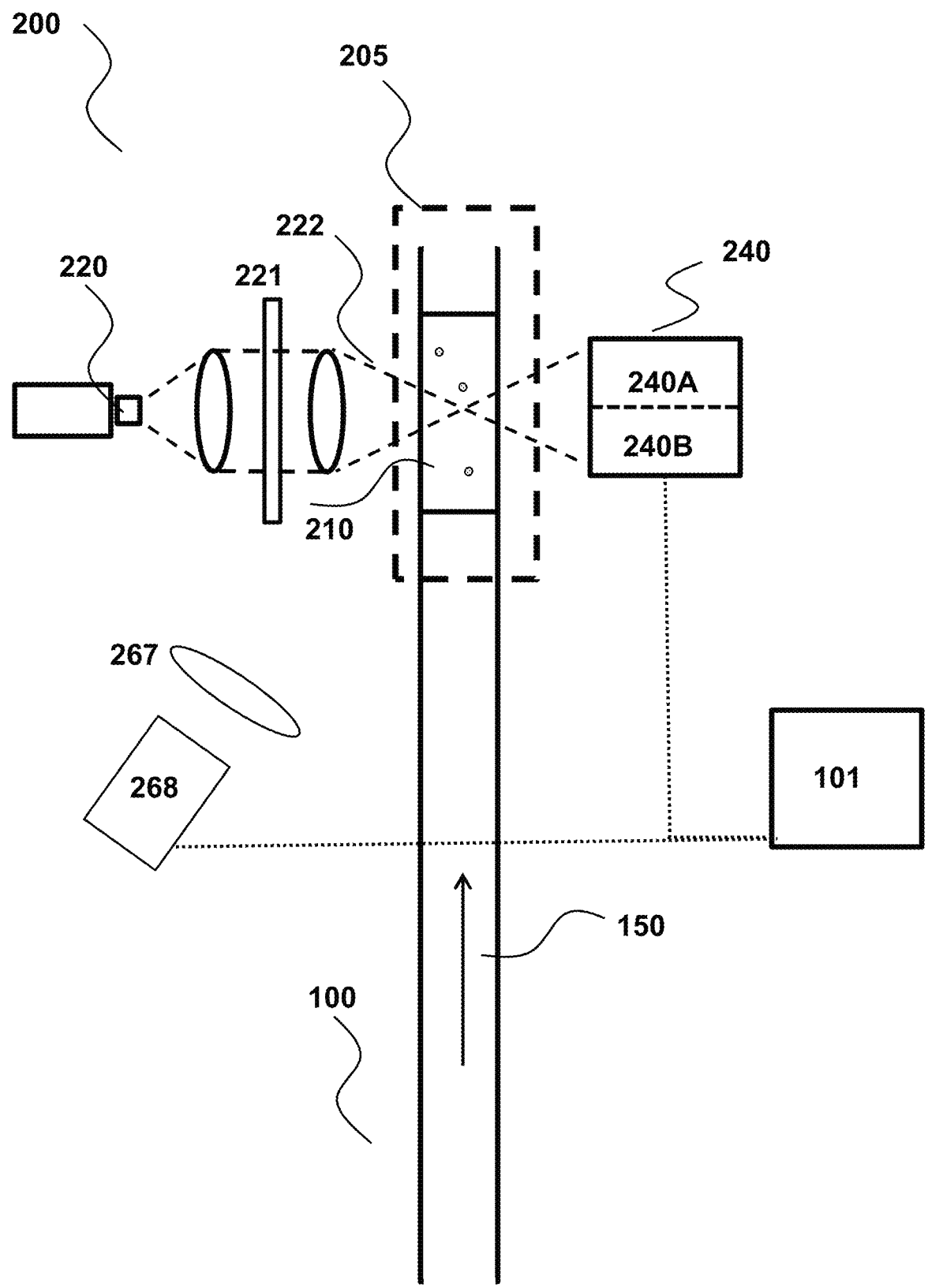
FIGS. 1A. and 1B provides schematics of system and method for on-axis particle measurements by detection of transmitted and forward scattered light, for example using a structured beam such as a dark beam, and optionally a differential detection configuration.

In the following description, numerous specific details of the devices, device components and methods of the present invention are set forth in order to provide a thorough explanation of the precise nature of the invention. It will be apparent, however, to those of skill in the art that the invention can be practiced without these specific details.

In general, the terms and phrases used herein have their art-recognized meaning, which can be found by reference to standard texts, journal references and contexts known to those skilled in the art. The following definitions are provided to clarify their specific use in the context of the invention.

"Particles" refers to small objects which are often regarded as contaminants. A particle can be any material created by the act of friction, for example when two surfaces come into mechanical contact and there is mechanical movement. Particles can be composed of aggregates of material, such as dust, dirt, smoke, ash, water, soot, metal, oxides, ceramics, minerals, or any combination of these or other materials or contaminants. "Particles" may also refer to biological particles, for example, viruses, spores and microorganisms including bacteria, fungi, archaea, protists, other single cell microorganisms. In some embodiments, for example, biological particles are characterized by a size dimension (e.g., effective diameter) ranging from 0.1-15 µm, optionally for some applications ranging from 0.5-5 µm. A particle may refer to a small object which absorbs, emits or scatters light and is thus detectable by an optical particle counter. As used herein, "particle" is intended to be exclusive of the individual atoms or molecules of a carrier fluid, for example water, air, process liquid chemicals, process gases, etc. In some embodiments, particles may be initially present on a surface, such as a tools surface in a microfabrication facility, liberated from the surface and subsequently analyzed in a fluid. Some systems and methods detect particles comprising aggregates of material having a size dimension, such as effective diameter, greater than 5 nm, 10 nm, 20 nm, 30 nm, 50 nm, 100 nm, 500 nm, 1 µm or greater, or 10 µm or greater. Some embodiments of the present invention detect particles having a size dimension, such as effective diameter, selected from that range of 10 nm to 150 µm, optionally for some applications 10 nm to –10 µm, optionally for some applications 10 nm to –1 µm, and optionally for some applications 10 nm to –0.5 µm.

The expression "detecting a particle" broadly refers to sensing, identifying the presence of, counting and/or characterizing a particle, such as characterizing a particle with respect to a size dimension, such as effective diameter. In some embodiments, detecting a particle refers to counting particles. In some embodiments, detecting a particle refers to characterizing and/or measuring a physical characteristic of a particle, such as effective diameter, cross sectional dimension, shape, size, aerodynamic size, or any combination of these. In some embodiments, detection a particle is carried out in a flowing fluid, such as gas having a volumetric flow rate selected over the range of 0.05 CFM to 10 CFM, optionally for some applications 0.1 CFM to 5 CFM and optionally for some applications 0.5 CFM to 2 CFM. In some embodiments, detection a particle is carried out in a flowing fluid, such as liquid having a volumetric flow rate selected over the range of 1 to 1000 m L/min.

"Optical Particle Counter" or "particle counter" are used interchangeably and refer to a particle detection system that uses optical detection to detect particles, typically by analyzing particles in a fluid flow. Optical particle counters include liquid particle counters and aerosol particle counters, for example, including systems for detecting individual single particles in a fluid flow. Optical particle counters provide a probe beam of electromagnetic radiation (e.g., a laser) into the analysis area or volume, where the beam interacts with any particles and then detects the particles based on scattered (forward and/or side scatter), emitted and/or transmitted light from the flow cell. Detection may focus on electromagnetic radiation that is scattered, absorbed, obscured and/or emitted by the particle(s). Various detectors for optical particle counters are known in the art, including for example, single detection elements (e.g., photodiode, photomultiplier tube, etc.), detector arrays including segmented detectors, cameras, various detector orientations, etc. Optical particle counter includes condensation particle counters, condensation nuclei counters, split beam differential systems and the like. When used in the context of a condensation particle counter, the particle counter portion typically refers to the detection system or components thereof (e.g., source of electromagnetic radiation, optics, filters, optical collection, detector, processor, etc.). In an embodiment, for example, an optical particle counter comprises a source for generating a beam of electromagnetic radiation, beam steering and/or shaping optics for directing and focusing the beam into a region where a fluid sample is flowing, for example a liquid or gas flowing through a flow cell. A typical optical particle counter comprises of a photodetector, such as optical detector array in optical communication with said flow cell, and collection optics for collecting and imagining electromagnetic radiation which is scattered, transmitted by or emitted by particles which pass through the beam. Particle counters may further comprise electronics and/or processors components for readout, signal processing and analysis of electrical signals produced by the photodetector including current to voltage converters, pulse height analyzers, and signal filtering and/or amplification electronics. An optical particle counter may also comprise a fluid actuation systems, such as a pump, fan or blower, for generating a flow for transporting a fluid sample containing particles through the detection region of a flow cell, for example, for generating a flow characterized by a volumetric flow rate. Useful flow rates for samples comprising one or more gases include a flow rate selected over the range of 0.05 CFM to 10 CFM, optionally for some applications 0.1 CFM to 5 CFM and optionally for some applications 0.5 CFM to 2 CFM. Useful flow rates for samples comprising one or more liquids include a flow rate selected over the range of 1 to 1000 m L/min.

The expression "interferometric detection of particles" refers to systems and methods using optical interference to detect one or more particles. In some embodiments, coherent beams of electromagnetic radiation are superimposed to cause optical interference for sensing, counting and/or determining a size characterization of a particle that interacts with at least a portion of the electromagnetic radiation.

"Structured beam detection" refers to systems and methods wherein a structured beam of electromagnetic radiation having a non-Gaussian intensity distribution is passed through a flow cell containing a particle and is detected using an optical detector array to sense, count and/or characterize the particle.

"Dark beam detection" refers to systems and methods wherein a dark beam of electromagnetic radiation, for example having a spatial intensity profile having region of attenuated intensity such as a centerline decrease in intensity, is passed through a flow cell containing a particle and is detected using an optical detector array to sense, count and/or characterize the particle.

Detecting and counting small particles (e.g., effective diameter less than 100 nm) in clean and ultraclean fluids in a manner that provides statistically significant data requires high signal-to-noise ratio (abbreviated as S/N or SNR). A high S/N ratio allows nanoparticles to be clearly detected above the noise floor. As used herein "statistically significant data" refers to detection of enough particles per unit time to be able to accurately assess contamination levels in the fluid. In some embodiments, high S/N does not relate to sizing accuracy directly. For example, in some optical particle counters the beam waist occupies a small fraction of the flow cell channel, and therefore, this approach monitors a subset of the total flow, such that it is possible for particles to pass through the edge of the beam where irradiance is less than the center. If a 50 nm particle passes through the outer edge of the beam, it may generate a signal similar to a 10 nm particle passing through the center of the beam. Therefore, it is possible form some optical particle counters to have high S/N and be able to detect 2 nm particles, while not having very good sizing accuracy. In some of the present optical particle counters and methods a goal is to be able to count enough particles to provide a quantitative, statistically sound, assessment of contamination levels in ultrahigh purity fluids in the shortest period of time. For example, the current state of the art particle counter may require up to 40 minutes to count enough particles to provide a statistically appropriate concentration (acceptable relative standard deviation) measurement when monitoring a state of the art ultrapure water system. By improving and maintaining a high S/N through the present systems and methods, the time interval needed to measure this minimum statistically acceptable particle counts can be reduced by 10× or more. This provides value as it allows a user to identify deviations from process control limits more quickly.

The expression "high signal-to-noise ratio" refers to a signal-to-noise ratio of an optical particle detection system sufficient for accurate and sensitive detection of particles in a fluid flow, including particles characterized by a small physical dimension (e.g., an effective diameter of less than or equal to 200 nm, optionally for some embodiments less than or equal to 100 nm and optionally for some embodiments less than or equal to 50 nm). In an embodiment, "high signal-to-noise ratio" refers to a signal-to-noise ratio sufficiently high to sense particles characterized by a small physical dimension, such as particles having an effective diameter as low as 20 nm, optionally for some applications a diameter as low as 10 nm and optionally for some applications a diameter as low as 1 nm. In an embodiment, "high signal-to-noise ratio" refers to a signal-to-noise ratio sufficiently high to accurately detect and count particles with a false detection rate of less than or equal to 50 counts/L, for example, for detection of particles having an effective diameter selected over the range of 1-1000 nm. In an embodiment, "high signal-to-noise ratio" refers to a signal-to-noise ratio sufficiently high to provide a minimum statistically acceptable particle count in a timeframe at least a factor of 10× less than in a conventional optical particle counter.

The expression "differential detection" refers to techniques and systems using the differential signal from forward looking on axis detector pair(s) for example, at a scattering angle that is within 0.5 degrees of zero degrees relative to the optical axis of the incident beam, optionally for some applications at a scattering angle that is within 0.1 degree of zero degrees relative to the optical axis of the incident beam, and optional is at or near zero degrees. A minimum of two pixels can be used to generate a differential signal (e.g., one upper (or top) and one lower (or bottom)), thereby forming a single pixel pair for differential detection. Alternatively, a plurality of pixels may be employed for each active detector area of a differential detector (e.g., the top active region and the bottom active region), such as a segmented differential detector comprising one or more pixel pairs, thereby using a plurality of pixel pairs, for example, wherein one pixel of each pixel pair corresponds to top active detector region and the other pixel of each pixel pair corresponds to the bottom active region. The number of pixel pairs may range, for example, from 1 to 500 pixels and, and optionally for some applications from 50-100 pixels. In some embodiment, the differential signal is generated by differentially adding signals from pixel pairs corresponding to different active regions of a segmented detector array, such as the top half and the bottom half. Differential detection may be used in the present systems and methods to provide a reduction of noise and thus enhanced signal-to-noise ratio. In some embodiments, for example, differential detection is used for detection of the combination of incident electromagnetic radiation transmitted through said flow cell and electromagnetic radiation forward scattered by one or more particle(s) in the fluid flow in the flow cell. In some embodiments, for example, the distribution of light incident has a power distribution that is balanced between the first and second active detection regions (e.g., upper half and lower half) of the differential detector, for example, such that the first and second active detection regions are characterized by incident radiant powers that are within 10%, optionally for some applications 5% and optionally for some application within 1%. Differential detection includes techniques and systems having closed loop control, for example, based on an evaluation the noise amplitude of the differential signal when particles are not present (i.e., in the absence of scattering form the particle). In some embodiments, a steering mirror is used to adjust the incident beam position on the detector to reduce or minimize noise levels of the differential signal, which may occur when the beam power is uniformly split between the first and second active detector elements (e.g., upper and lower elements of the detector). Close loop control can also be achieved by translating the detector position and rotating the detector to align the beam and detector axes so as to reduce or minimize noise levels of the differential signal.

"Structured Beam" refers to a coherent beam of electromagnetic radiation (e.g., a laser) having a non-Gaussian spatial intensity distribution. Structured beams include beams characterized by an attenuated region, such as a dark beam, beams with a line focus with a dark line singularity, beams characterized by two or more discrete intensity lobes, etc. In an embodiment, a structured beam corresponds to a transverse mode, such as a TEM01. Structured beams include focused, synthesized, laser beams. Structured beams and dark beams may be generated by techniques known in the art including using an optical mask, modification of a laser cavity, combining multiple beams, spatial and/or polarization filters and other manipulations such as in an interferometric or polarization modification scheme.

"Beam propagation axis" refers to an axis parallel to the direction of travel of a beam of electromagnetic radiation.

"Optical communication" refers to components which are arranged in a manner that allows light to transfer between the components. Optical communication includes configurations where two elements are directly in optical communication wherein light travels directly between the elements and configurations where two elements are indirectly in optical communication wherein light travels between the elements via one or more additional optical elements, such as lenses, mirror, windows, filters, etc.

"Optical axis" refers to a direction along which electromagnetic radiation propagates through a system.

"Optical detector array" refers to an optical detector for spatially resolving input signals (e.g., electromagnetic radiation) in two dimensions across an active area of the detector. An optical detector array may generate an image, for example an image corresponding to an intensity pattern on the active area of the detector. In an embodiment, an optical detector array comprises an array of individual detector elements, also referred herein as pixels; for example: a two-dimensional array of photodetectors, a charge-coupled device (CCD) detector, a complementary metal-oxide-semiconductor (CMOS) detector, a metal-oxide-semiconductor (MOS) detector, an active pixel sensor, a microchannel plate detector, or a two-dimensional array of photodiodes.

"Optical source" refers to a device or device component for delivering electromagnetic radiation to a sample. The term is not limited to visible radiation, such as by a visible light beam, but is used in a broad sense to include any electromagnetic radiation also inclusive of visible radiation, ultraviolet radiation and/or infrared radiation. The optical source may be embodied as a laser or laser array, such as a diode laser, diode laser array, diode laser pumped solid state laser, LED, LED array, gas phase laser, solid state laser, to name a few examples. In some embodiments, an optical source is for generating one or more coherent beams of electromagnetic radiation, for example, to generate a probe beam in an optical particle counter. In an embodiment, an optical source may include one or more components, such as a beam shaping system, phase mask, beam combiner, polarization controller, wave plate, or other component for generating a structured beam, such as a dark beam, for providing a probe beam in an optical particle counter.

The term "electromagnetic radiation" and "light" are used synonymously in the present description and refer to waves of electric and magnetic fields. Electromagnetic radiation useful for the methods of the present invention include, but is not limited to ultraviolet light, visible light, infrared light, or any combination of these having wavelengths between about 100 nanometers to about 15 microns.

A "high aspect ratio" beam refers to an optical beam, such as a laser beam including structured beam or dark beam, having an aspect ratio selected from the range of 10:1 to 200:1.

The present systems and methods integrate active and/or passive components for enhancing optical particle detection on-axis particle measurements by detection of transmitted and forward scattered light, for example using a structured beam such as a dark beam, and optionally a differential detection configuration to provide important performance benefits including (i) providing high signal-to-noise ratios and increased sensitivity for detection and size characterization of small particles (e.g., effective lateral dimensions (e.g., diameter) of ≤10 microns, or optionally ≤1 microns or optionally ≤500 nanometers), (ii) increasing the amount of sample fluid analyzed as a function of time and/or (iii) suppressing false positive indications.

FIG. 1 provides a schematic of a system for detection of particles via on-axis particle measurement by detection of transmitted and forward scattered light, for example using a structured beam such as a dark beam and a differential detection configuration. A shown in FIG. 1, particle detection system (200) includes a flow cell (210) for transporting flow of fluid (150) including particles (schematically depicted as circles within flow cell (210), such as a gas or liquid flow having particles. Optical source (220), such as a laser source, generates electromagnetic radiation that is provided to beam steering and shaping system (221) for generating a probe beam (222), such as a structured beam including a dark beam, that is provided to flow cell (210). The probe beam passes through flow cell (210) and is detected via an on-axis optical detector array (240), such as segmented 1D or 2D optical detectors (240A and 240B) comprising one or more pixel pairs, which is in operation communication with processor (101) to provide an output signal(s) to processor (101). Optical detector array (240) and/or processor (101) may be provide differential detection, for example in a configuration wherein individual segmented detector regions are each positioned over different intensity lobes of a structured beam, such as a dark beam.

Processor (101) receives and analyzes the output signals from the optical detector array (240), for example via generation and analysis of a differential signal combining (e.g., differentially adding, subtraction, etc.) of signals from segmented 1D or 2D optical detectors (240A and 240B) to provide detection of the particles, such as by counting and/or size characterization. In some embodiments, one or more translators (205), such as an oscillator, displacer, piezoelectric element, etc., is operationally coupled to flow cell (210) to provide for rapid translation (e.g., at an average translation velocity at least 2 times faster than the average velocity of the particle passing through the beam) of the flow cell laterally (e.g., in a direction orthogonal to the axis of the incident probe beam) and/or in the z-axis (e.g., along the beam axis between the optical source and the detector and/or along the axis of the incident probe beam) to achieve greater sampled volume of fluid per unit time. In some embodiments, for example, said optical detector array (240) is provided at a scattering angle that is within 5 degrees of zero degrees relative to the optical axis of the incident beam, and optionally provided at a scattering angle that is within 0.5 degrees of zero degrees relative to the optical axis of the incident beam and optionally provided at a scattering angle that is within 0.1 degrees of zero degrees relative to the optical axis of the incident beam.

Also shown in FIG. 1A is an optional side scatter photodetector (268) and side scatter collection optics (267) which are positioned off-axis relative to the beam propagation axis of the probe beam (222) and the detector axis of optical detector array (240). Side scatter collection optics (267), such as one or more lenses and/or mirrors, is positioned to receive off-axis scattered light resulting from interaction with a particle in flow cell (210) and the probe beam. Side scatter collection optics (267) directs, and optionally images, at least a portion of collected scattered light on to side scatter photodetector (268) which is in operation communication to provide an output signal(s) to processor (101) for analysis to detect and/or characterize the particle(s). Embodiments incorporating the combination of on-axis differential detection and off-axis side scatter detection are particularly useful for characterizing particles as biological or non-biological particles. In some embodiments, for example, processors (101) compares signals from on-axis optical detector array (240) and side scatter photodetector (268), so as to determine if a particle is a biological particle or a non-biological particle. In some embodiments, for example, a small output signal from side scatter photodetector (268) or lack of a measurable signal from side scatter photodetector (268), accompanying a measurable signal from on-axis optical detector array (240) is indicative of a biological particle, such as a microbial particle.

Figure 1B:
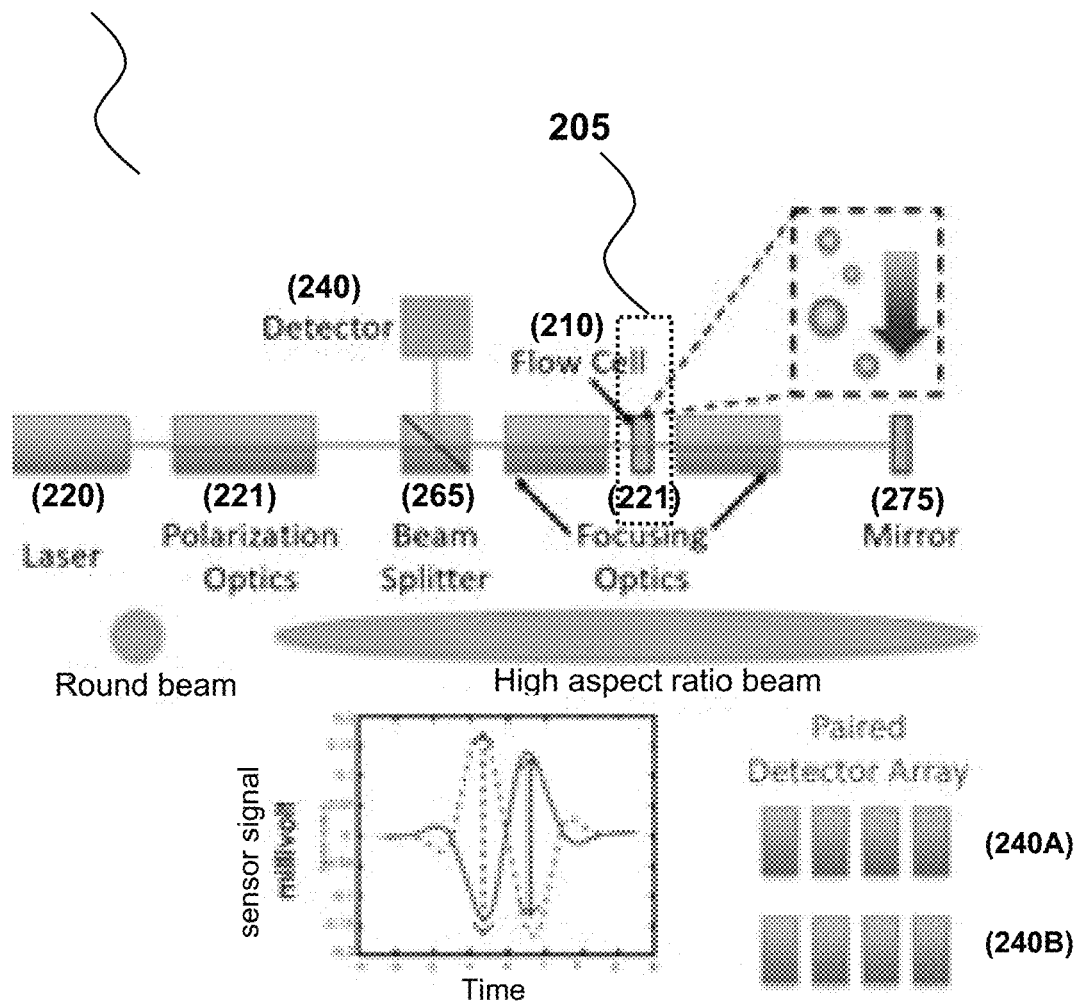

FIG. 1B provide a schematic of an alternative system for detection of particles on-axis particle measurements by detection of transmitted and forward scattered light, for example using a structured beam such as a dark beam, and a differential detection configuration, wherein the optical geometry is set up to provide a dual pass optical geometry. As shown in FIG. 1B, the system (200) includes optical source (220), beam steering and shaping system (221), flow cell (210), optical detector array (240) comprising a paired detector array and translators (205). In addition, beam splitter (265) and mirror (275) are included to provide a dual pass optical geometry. Optionally, the beam steering and shaping system (221) provides for a high aspect ratio beam, such as a beam characterized by an aspect ratio selected from the range of 10:1 to 200:1, provided to the flow cell (210) and optical detector array (240) is configured as a paired detector array including paired detector arrays (240A and 240B, expanded out from their position within detector (240) and schematically illustrated for clarity separately below the particle detection schematic next to an example signal corresponding to a particle detection event). Optical detector array (240) may be configured to provide differential detection, optionally wherein paired detector arrays (240A and 240B) are positioned over the intensity lobes of a structured beam such as a dark beam. In some embodiments, one or more translators (205), such as an oscillator, displacer, piezoelectric element, etc., are operationally coupled to flow cell (210) to provide for rapid translation (e.g., at an average translation velocity 2 times faster than the average velocity of the particle passing through the beam) of the flow cell laterally and/or in the z-axis (e.g., along the beam axis between the optical source and the detector and/or along the axis of the incident probe beam) to achieve greater sampled volume of fluid per unit time. In some embodiments, for example, said optical detector array is provided at a scattering angle that is within 5 degrees of zero degrees relative to the optical axis of the incident beam, and optionally provided at a scattering angle that is within 0.5 degrees of zero degrees relative to the optical axis of the incident beam.

FIG. 1B also shows a representative signal of the optical detector array (240) showing a signals from individual paired detector arrays (240A and 240B) as a function time (or particle trajectory through the beam) for a particle passing through the beam in the flow cell, wherein the solid line is the signal from detector array 240A and the dotted line is the signal from detector array 240B. As shown in FIG. 1B, the signals from individual paired detector arrays (240A and 240B) are each characterized by a minimum value and a maximum value and are inverted with respect to each other. Signals from individual paired detector arrays (240A and 240B) may be combined, for example via differential addition, subtraction, multiplication, etc., to provide a signal, such as a differential signal, that can be analyzed to provide accurate information as to the size, optical properties (e.g., refractive index) and composition of the particle.

The depicted optical geometry allows for constructive and destructive interference of the beam which aids in sensitivity, for example, involving the combination of light transmitted from the flow cell and forward light scattered from the particle in flow cell. The use of dual pass optical geometry and differential detection aids in sensitivity and accuracy for detection of small particles (e.g., have effective dimensions less than 100 nm, optionally less than 50 nm and optional less than 20 nm)). The use of a high aspect ratio beam increases the sample volume for which particles may be detected, which increase the amount of sample that can be monitored per unit time.

Figure 2:
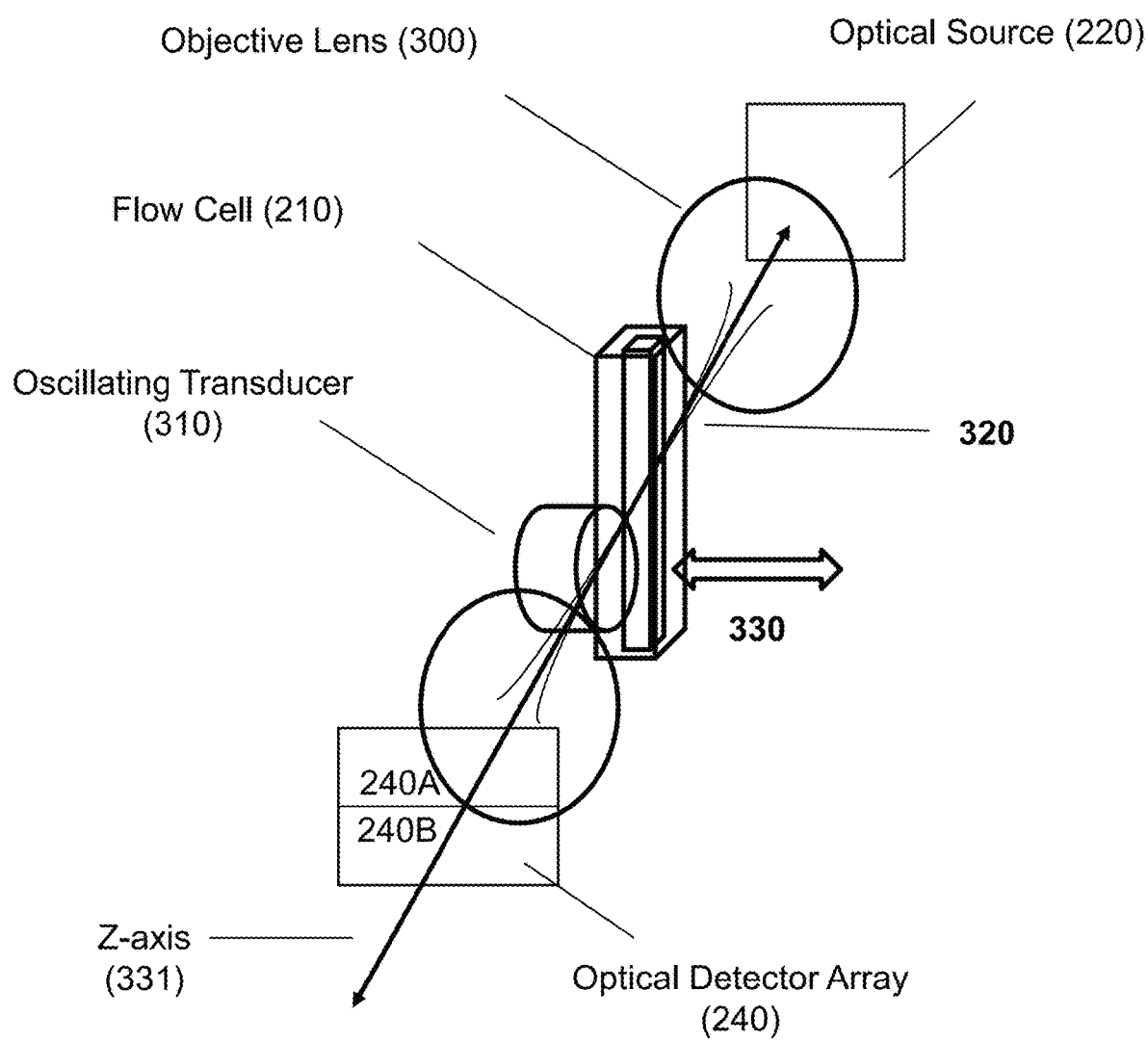
FIG. 2 shows a perspective view of components of a particle measuring system illustration an oscillating transducer operably connected to a sample cell which is in optical communication with an objective lens.

FIG. 2 shows a perspective view of components of a particle measuring system including an oscillating transducer operably connected to a sample cell in optical communication with an objective lens. As show in FIG. 2, objective lens (300) directs and focuses an optical beam (320), such as a structured beam, from an optical source (220) onto flow cell (210) which is operationally coupled to a translator comprising an oscillating transducer (310) for translating the flow cell (210) along lateral direction (330), which is optionally orthogonal to z-axis (331) corresponding to the propagation axis of the incident beam, such that the area of high radiation density changes position in the flow cell, thereby allowing for an increase in volume of analyzed fluid per unit time. In some embodiments, transducer (310) provides for translation of the flow cell (210) along the z-axis (331), such that the area of high radiation density changes position in the flow cell, thereby allowing for an increase in volume of analyzed fluid per unit time. The electromagnetic radiation transmitted by the flow cell and electromagnetic radiation forward scattered by particles in the flow cell are detected by optical detector array (240), such as segmented 1D or 2D optical detectors (240A and 240B), for example using an on axis differential detection system.

Figure 3:
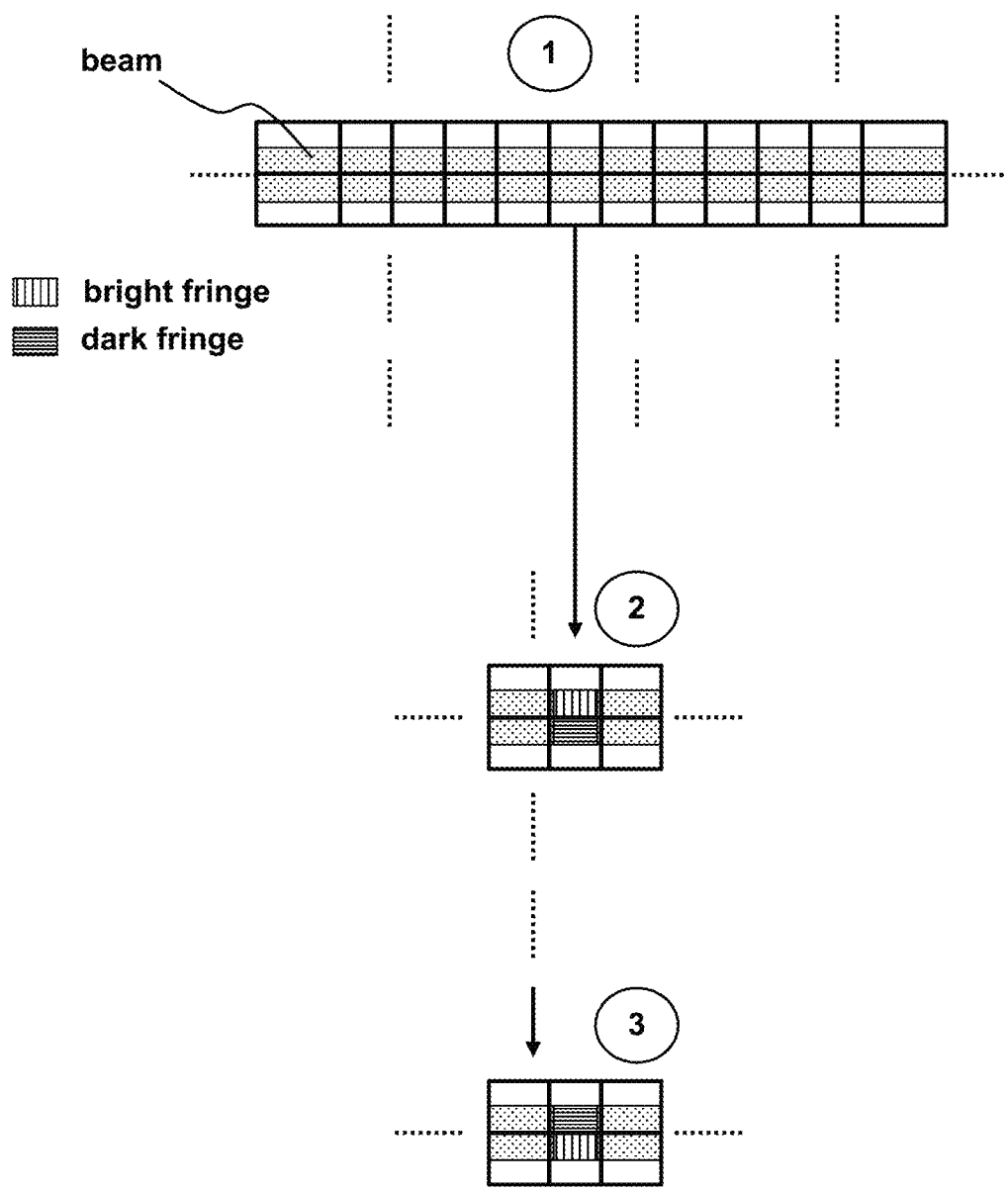
FIG. 3 provides a schematic showing an example pixelated, differential detector configuration.

FIG. 3 provides a schematic showing an example imaged detector using a pixelated, differential detector configuration. Section 1 of FIG. 3, provides a schematic of a beam imaged on a pixelated detector having top active region ("the top half") and bottom active region ("the bottom half"), wherein the energy of the beam is evenly distributed (50% in each) between top and bottom detector halves to within ±1% to 5%. The beam energy is balanced across the two active regions so correlated-laser noise is at least partially cancelled using differential detection. In addition, sizing matching of the pixel relative to the signal (i.e., the spatial extent of signal) optimizes signal-to-noise ratio, for example to provide a high signal-to-noise ratio.

Section 2 of FIG. 3, provides a schematic of a beam imaged on a pixelated detector, corresponding to conditions wherein a particle enters the beam in the flow cell, for example entering the beam from the bottom. As shown in Section 2 of FIG. 3, a bright fringe is observed on one, or a subset of pixels, for the top half of the pixelated detector and dark fringe is observed on one, or a subset of pixels, for the bottom half of the pixelated detector. Section 3 of FIG. 3, provides a schematic of a beam imaged on a pixelated detector, corresponding to conditions wherein a particle is translating through the top of the beam waist in the flow cell. As shown in Section 3 of FIG. 3, a dark fringe is observed on one, or a subset of pixels, for the top half of the pixelated detector and bright fringe is observed on one, or a subset of pixels, for the bottom half of the pixelated detector. In this configuration, the differential signal is driven by fractional fluctuation of power at detector. As pixel size increases, fractional fluctuation decreases when a particle intersects with the beam. If the pixel gets too small, the power on the detector goes down and signal amplitude goes down even if the fractional fluctuation stays the same. Accordingly, there is an optimum in the middle reflecting this trade off.

Figure 4:
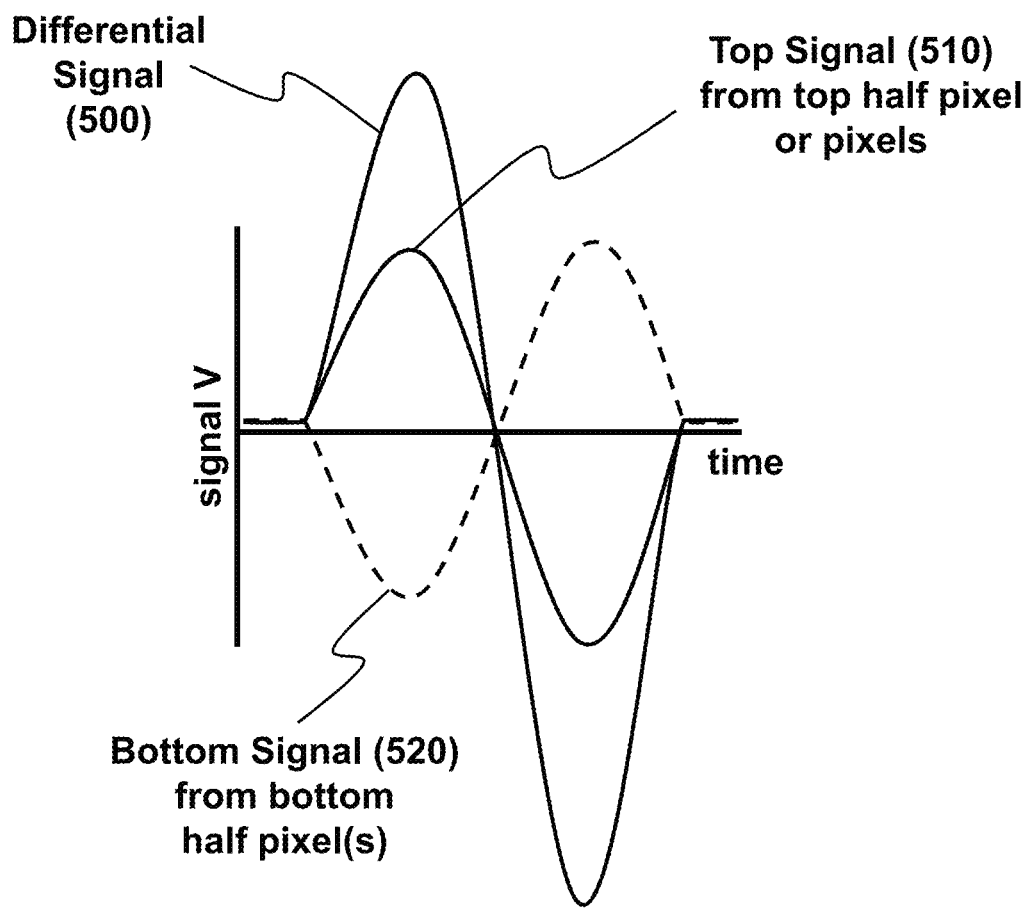
FIG. 4 provides a schematic showing optical geometry and detector configurations for measurement of refractive index, including example signals showing "flipping of the classical particle signal" so as to distinguish between different particle composition.

FIG. 4 provides a schematic showing example signals as a function of time achieved using differential detection of a particle including the Differential Signal (500), Top Signal (510) from the pixel or subset of pixels from the top half of the differential detector and Bottom Signal (520) from the pixel or subset of pixels the bottom half of the differential detector. As illustrated in FIG. 4, the Differential Signal (500) is generated by differentially adding the Bottom Signal (520) and the Top Signal (510). By deriving the Differential Signal (500) from Top Signal (510) and Bottom Signal (520) in this manner, a simultaneous reduction in noise is realized via correlated differential noise cancellation and, thereby enhances overall signal-to-noise ratio.

The Differential Signal (500) may be analyzed to provide information as to the effective size dimension(s) and optical properties (e.g. refractive index) of the particle and to distinguish between different particle optical properties such as refractive index and, thus, provide information on particle composition. To illustrate this concept, detection of particles having different refractive indexes and compositions are compared—(i) polystyrene latex (PSL) vs (ii) gold nanoparticle. PSL particles have a refractive index of 1.59 which is greater than water's refractive index of 1.33, therefore, upon entering the beam (e.g., circumstances corresponding to Section 2 of FIG. 4) a bright fringe is observed on the top half of the differential detector and a dark fringe is observed on the bottom half of the differential detector; and upon translating through the beam waits (e.g., circumstances corresponding to corresponding to Section 3 of FIG. 4) a dark fringe is observed on the top half of the differential detector and a bright fringe is observed on the bottom half of the differential detector. If on the other hand, gold nanoparticles having a refractive index less than the refractive water at the wavelength of the probe beam are analyzed using some embodiments of the present differential detection methods, an inverted signal relative to PSL particles is observed, wherein upon entering the beam (e.g., circumstances corresponding to Section 2 of FIG. 4) a dark fringe is observed on the top half of the differential detector and a bright fringe is observed on the bottom half of the differential detector; and upon translating through the beam waits (e.g., circumstances corresponding to corresponding to Section 3 of FIG. 4) a bright fringe is observed on the top half of the differential detector and a dark fringe is observed on the bottom half of the differential detector. In this manner, the sequence and position of bright and dark fringes as observed in the differential signal may be used to characterize the refractive index (and composition) of the particles analyzed by the present methods.

1D and 2D detectors, including segmented detectors, are useful for differential detection in certain embodiments. With 1D segmented detectors two options are useful for some applications: (i) orient the detector segments vertically or parallel to particle transit through the beam such that two adjacent pixels can be used as a single pair of upper and lower pixels; or, mount two 1D detectors at 90 degrees to the beam and use a knife edge prism to send the top half of the beam to one 1D detector and the lower half of the beam to a second 1D detector. The number of pixel pairs may range, for example, from 1 to 500 pixels and, and optionally for some applications from 50-100 pixels. Pixel widths selected from the range of 10 to 500 microns are useful in certain embodiments and optionally for some applications selected from the range of 50-100 microns.

Figure 5:
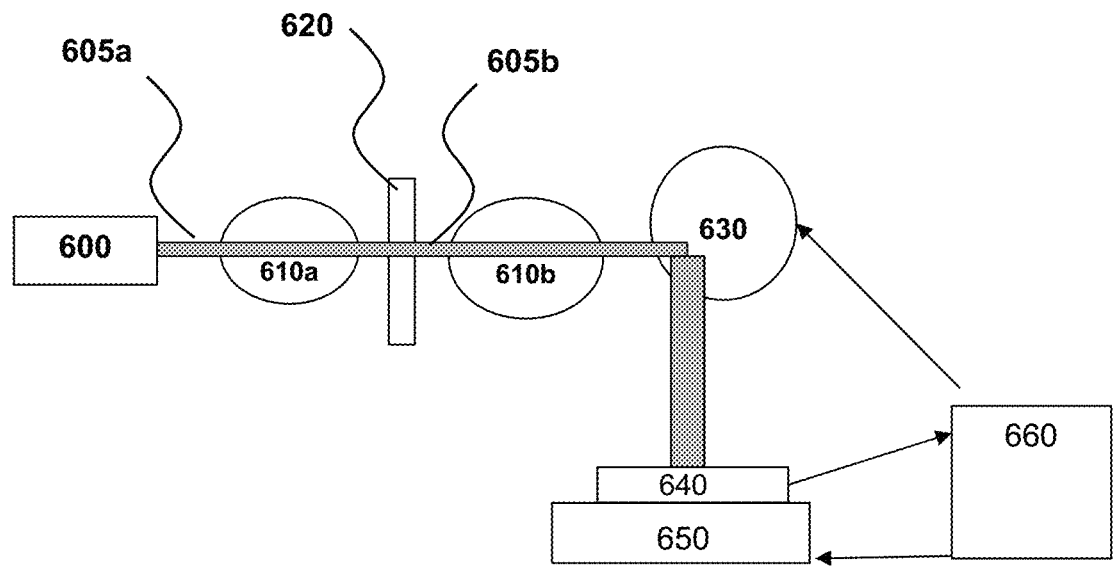
FIG. 5 provides a schematic showing optical geometry and detector configurations for providing closed loop feedback control of differential detector alignment.

FIG. 5 provides a schematic showing an optical geometry and detector configuration for providing closed loop feedback control of differential detector alignment, for example, to balance beam energy across the two active regions of the detector (e.g., the top half and bottom half) so laser noise is at least partially cancelled using differential detection. Use of closed loop feedback control in certain embodiments, is useful for correcting alignment drift and/or addressing outside acoustical or vibration interference. As depicted in FIG. 5, optical source (600), such as a laser, provides optical beam (605a), for example a structured beam, which is passed through flow cell (620) via steering and/or focusing optics (610a). The optical beam (605a) interacts with particles in a fluid flowing through flow cell (620), thereby generating transmitted electromagnetic radiation and forward scattered electromagnetic radiation (together 605b), which is collected via collection optics (610b). Transmitted electromagnetic radiation and forward scattered electromagnetic radiation (605b) is directed on to mirror (630), optionally steering mirror, which directs at least a portion of transmitted electromagnetic radiation and forward scattered electromagnetic radiation (605b) on to differential detector (640) for example, a segmented detector having a first active region and a second active region (e.g., top half and bottom half). Positioner (650) is in operationally coupled to differential detector (640) so as to adjust the position of the differential detector (640), such as to move the detector laterally and/or vertically or to rotate the detector. In an embodiment, processor (660) is in operational communication with mirror (630) and/or positioner (650) so as to control the relative alignment of transmitted electromagnetic radiation and forward scattered electromagnetic radiation (605b) on first and second active regions of differential detector (640) such as top half and bottom half of differential detector (640). In an embodiment, processor (660) receives and analyzes signals corresponding to the first active region and the second active region (e.g., top half and bottom half) and determines the differential signal.

In order to minimize noise and maximize signal, the power transmitted electromagnetic radiation and forward scattered electromagnetic radiation (605b) of may be balanced between the first active region and the second active region (e.g., top half and bottom half) differential detector (640). In some embodiments, this is accomplished with a closed loop system wherein the processor analyzes the differential signal when particles are not present and minimizes the noise amplitude of the differential signal via control of positioner (650) and mirror (630). In some embodiments, for example, mirror (630) is used to adjust the beam position on the detector (640) to minimize noise levels of the differential signal. This condition occurs when the beam power is most uniformly split between the upper and lower elements of the differential detector. Minimize noise levels of the differential signal can also be achieved, for example, via translating the detector position and rotating the detector (640) to align the beam and detector axes using positioner (650).

The invention can be further understood by the following non-limiting examples.

Example 1—Particle Measurement Using Structured Beams and/or Differential Detection This example describes optical geometries, detector configurations and signal analysis techniques allowing for enhancements for particle detection and size characterization corresponding to specific embodiments which are intended to exemplify certain specific features of the invention.

Scanning Modulated Focus:

In some embodiments, for example, the system is designed to create a region of high laser beam optical power density at the point of measurement. In conventional systems, this illumination area is typically constrained by the focus angle of the objective lenses and limits cross sectional area within the sample cell within which the smallest particles can be identified and characterized. Use of a high speed mechanical oscillator, such as a piezoelectric or similar device, can be used to physically move or translate the sample cell closer to and farther away from the objective lens. This mechanical translation moves the point of highest optical density within the sample cell. When done at sufficiently high frequency and faster than the particle transit time of the laser beam, allows a larger cross-sectional area of the sample cell to be characterized for particulates. This approach results in an increased sample volume of fluid per unit of time without requiring increases in laser power.

Scanning Modulation Cross Axis:

In some embodiments, for example, the system is designed to create a region of high laser beam optical power density at the point of measurement. In conventional systems, this area is typically constrained by the focus angle of the objective lenses and limits cross sectional area within the sample cell within which the smallest particles can be identified and characterized. Use of a high speed mechanical oscillator such as a piezoelectric or similar device can be used to physically move or translate the sample across the laser beam. This mechanical translation moves the point of highest optical density laterally within the sample cell. When done at sufficiently high frequency and faster than the particle transit time of the laser beam, allows a larger cross-sectional area of the sample cell to be characterized for particulates. This essentially results in an increased sample volume of fluid per unit of time without requiring increases in laser power.

Two-Dimensional Scanning Modulation:

In some embodiments, for example, the scanning modulated focus and scanning modulation cross-axis can be used individually or in combination for increased cumulative effect.

Imaging Sample Volume on Detector:

In some embodiments, for example, this feature derives from the relationship that the signal-to-noise ratio (SNR or S/R) will be maximized when at least a portion of the pixels of the photodetector each has a width sufficient to collect the majority of the energy of the particle-beam interaction signal. The image of the particle-beam interaction signal is important in the slow axis (long axis) of the beam at the detector. The vertical extent of the signal in the beam is less important. The signal will transition across the upper and lower detector elements as the particle transits the beam. To maximize signal-to-noise, the spatial extent of the particle-beam interaction signal in the slow axis may be predominantly located on a single pair of detector elements. Dispersing the particle-beam interaction signal across multiple pairs of detectors will reduce the signal-to-noise of the measurement. Considering that the sample volume may be illuminated with a high aspect ratio beam—with orthogonal beam waists at the location of the sample volume—an image of this location created along the beam axis will be similarly shaped and should have sufficient magnification to distribute the image over an appropriate number of pixel detector elements.

An alternative detector geometry may include the following features. After the focused beam passes through the sample volume, where the horizontal and vertical beam waists are in the same transverse plane in the sample volume, the beam is collected by downstream optics and re-collimated. In this region of the beam the signal of particle events occurring at or near the beam waists is distributed over the transverse span of the collimated beam. To optimize the signal-to-noise ratio, the beam is brought to a focus onto a pixelated detector, where pixel size is the same or smaller than RMS spot size of the focusing optics. In this way spatial discrimination of particle events throughout the sample volume is realized. A minimal detector area (area of a pixel) is utilized to capture a particle event.

Fractional Attenuation Imaging:

In some embodiments, for example, the wide (horizontal) and narrow (vertical) image of the sample volume beam cross-section, being created by focusing the beam after it passes through the sample volume onto a pixelated detector plays a role in the present systems and methods. This image at the detector may be a magnified reproduction of the beam profile at the sample volume. As a particle transits the beam at or near the waist, its image at the detector will be a vertical trajectory across the image footprint. In the vein of maximizing the signal-to-noise ratio as described above, a horizontal slice (possibly single-pixel width vertically) of the image footprint may be the means to achieve an optimal signal-to-noise ratio.

High Aspect-Ratio Beam:

In some embodiments, for example, as the beam is presented to the sample fluid flow it will be shaped and focused by appropriate optical elements. It will be brought to a tight focus in the direction of fluid flow. If the fluid flows along the y-axis, the beam will be tightly focused in the y-direction; the point of tightest focus identifies the location of the y-axis beam waist. With the z-axis being along the axis of the beam, then along the x-axis the beam will be much wider than it is in the y-direction, but the beam will also need to be at its minimum x-axis width in the same transverse xy-plane as the y-axis waist. The beam shaping optics will be arranged so that the locations of the x-axis and y-axis waists occur in the same xy-plane. This being the case, both the x- and y-axis beam profiles will converge to their respective waists in the same xy-plane and will diverge from there in the propagation direction. This constitutes the high aspect-ratio beam. The co-location of the waists in the same xy-plane is necessary for downstream imaging considerations.

Differential Signal:

In some embodiments, for example, using the differential signal from the forward looking, on axis detector pair(s) at a scattering angle of zero degrees results in significant noise reduction.

Microbial Detection:

In some embodiments, for example, use of a structured beam or dark beam with on-axis differential detection is very effective at detecting micro-organisms in water even though they have a very small index of refraction contrast. Micro-organisms are often not typically observed with conventional light scattering particle counters due to the low index of refraction contrast (they contain mostly water). A particle counter of some embodiments uses a dark beam with on-axis differential detection combined with side scatter detection. If both detectors create an appropriately sized signal, the particle is not a micro-organism. If on-axis differential detector provides a large signal and the side scatter provides no response, it is a micro-organism.

RI Differences Between Particle and Media:

In some embodiments, for example, the shape of the differential signal vs. time depends on refractive index of the particle relative to the media. The differential detection signal is either an increasing signal above zero followed by a decreasing signal below zero (bump followed by dip) or the opposite with the signal decreasing below zero followed by an increasing signal above zero (dip followed by bump). This signal changes based on the direction of flow and on whether the top detector is subtracted from the lower or vice versa. As an example: for a given configuration, if the refractive index of the particle is greater than the refractive index of the media the detection signal will be a bump followed by a dip while if the refractive index of the particle is less than the media, the signal will be a dip followed by a bump. The types of materials with a refractive index less than water or fluid chemicals are gases and many metals. Material with an index of refraction less than gases include certain metals (in the visible portion of the spectrum).

Closed Loop Focus System:

In some embodiments, for example, adjusting optical elements in all three axes provides useful and/or optimal beam power density and/or beam size. Diverting a small portion of the beam which is going to the photo detector to an imager and using the size, shape, and or power density to provide conditions for useful and/or optimal particle detection. The laser beam may be precisely balanced evenly/equally across the upper and lower elements of the differential detector, in order for the laser noise to cancel out in the differential signal. In other words, the detected power may beneficially and/or optimally be the same for the upper and lower detector. This can be accomplished in some embodiments by translating the detector vertically (also a tilt function for 2D array to align with high aspect ratio beam) or by steering the laser beam with a mirror or lens to maximize noise cancelation. In some embodiments, a closed loop system is implemented where the detector and laser are automatically aligned in an arrangement that minimizes background noise by optimizing the "balance" of laser power across the differential detector elements. Additionally, a closed loop focus system may be used to adjust the 5-axis optical translation stages to provide optimal beam power density and/or beam spot size. For example, a small fraction of the beam can be redirected to an imager and the image obtained can be used to determine the adjustments required to obtain optimal beam size, shape, and power density.

When the operating temperature of detectors is lowered, a lowering of the detectors Dark Current follows. This lowering of Dark Current improves the detector's SNR (Signal-to-noise Ratio) and lowers the detector's NEP (Noise Equivalent Power) making it more sensitive to lower incident light levels. There is a theoretical limit to this response in thermal change and designing a thermal system to cool to the necessary levels with the required stability may be employed.

Chopper Use:

In some embodiments, for example, further improvement in the extraction of low-level optical signals buried in the noise floor can be realized by considering the problems inherent in DC techniques and how these can be reduced through the use of AC methods and a modulated light, or chopper approach. In some embodiments, the chopper is used to turn on and turn off the detector's incident light, changing it from a DC illumination to AC illumination, typically in the KHz range. In some embodiments, using a lock-in amplifier, narrowly bandwidth tuned to the chopper frequency creates synchronous signal detection. Most physical systems including the electronic optical detection and amplification involved in particle detection have increased noise as the frequency approaches DC. For example, typical Op-amps used in particle detection have 1/f noise. By moving the detection measurement away from low frequency, or DC noise sources to measurements at the AC chopper frequency, higher signal-to-noise ratio and detection of much weaker signals typically associated with smaller particles, can be achieved.

Signal Processing Techniques in Particle Signal Detection:

In some embodiments, the path and speed that various particles of different size and material types take through the impinging light source in the time domain are useful considerations for the design and signal analysis in the present systems and methods. For example, the sampling of these discrete and complex time domain signals can then be transformed into the frequency domain through the Fourier transformation, or FFT (Fast Fourier Transformation). The decomposition of the complex periodic signal trace of particles provides an equation of the frequency domain signal made up of a set sinusoids with different amplitudes, frequencies and phase. In some embodiments, a collection, or library of equations of decomposed particle signals collected during development can be cataloged and used when the magnitude of the inherent noise of the system is very close to the magnitude of the particles being witnessed, or low signal-to-noise ratio conditions. In some embodiments, the collected particle signals have inherent structure, unique to the design of the invention, that one can use signal processing techniques to uncover the expected signal from the unidentifiable disordered signal representing the contaminating system noise.

In some embodiments, the equation models, or filters, are what is believed to be the structure of possible signals of interest. In some embodiments, when attempting to identify the structure in an incoming signal, the mathematical filters are used and imposed on the arriving signal. In some embodiments, various techniques of signal processing can be used including convolving the arriving transformed signal with the catalog of filters (assuming the arriving and modeled signals are linear time invariant). In some embodiments, correlation between the arriving signal and the catalog of filters can be used. Resent developments in the Convolutional Sparse Modeling technique can be used together with thresholding, relaxation or approximation. In some embodiments, mutual Coherence can be used to break up the arriving signal into smaller patches of variable delay (phase) and width (frequency) and tested against the catalog of models, with the assumption that the arriving signals are piece wise constant signals.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The following patents and patent applications relate to interferometric particle detection using a structured beam and are incorporated by reference in their entireties: U.S. Pat. No. 7,746,469; US Publication 20170176312; and PCT publication WO 2019/082186.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, are disclosed separately. When a Markush group or other grouping is used herein, all individual members of the group and all combinations and sub-combinations possible of the group are intended to be individually included in the disclosure.

Every device, system, formulation, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A system for detecting particles in a fluid, the system comprising:
    a flow cell for flowing a fluid containing particles along a flow direction through a beam of electromagnetic radiation,
    an optical source in optical communication with the flow cell for providing the beam of electromagnetic radiation;
    a focusing system in optical communication with the optical source for focusing said beam of electromagnetic radiation to generate an area of high radiation density within said flow cell; and
    an optical collection system for collecting and directing at least a portion of electromagnetic radiation onto a pixelated photodetector, wherein for at least a portion of the pixels of said pixelated photodetector each pixel has an area corresponding to a spatial extent of the particle beam interaction signal within the beam;
    wherein the pixelated photodetector produces an electric signal characteristic of the number and/or size of the particles detected.

2. The system of claim 1, wherein each pixel has a width independently selected from the range of 10 to 500 microns.

3. The system of claim 1, wherein each of the at least a portion of the pixels of said pixelated photodetector has an area corresponding to at least 75% of the spatial extent of the particle beam interaction signal within the beam.

4. The system of claim 1, wherein the optical collection system comprises:
    an on-axis optical collection system for collecting and directing at least a portion of electromagnetic radiation onto a photodetector, thereby generating an on-axis signal; and
    a side scatter detector in optical communication with said flow cell position to receive off-axis scattered light, thereby generating a side scattered signal;
    wherein comparison of the side scattered signal to the on-axis signal distinguishes between biological and non-biological particles.

5. The system of claim 4, wherein the on-axis optical collection system is disposed at a scattering angle that is within 1 degree of zero degrees relative to the beam of electromagnetic radiation.

6. The system of claim 1, wherein each detector element of the pixelated photodetector produces an electric signal characteristic of the number and/or size of the particles detected and said photodetector characterizes said particles based on a differential signal generated from the detector element signals, the system comprising:
    a processor configured to receive said detector element signals and characterize whether said particles have a lower or higher refractive index than said fluid.

7. The system of claim 6, wherein the processor is configured to characterize the refractive index of the particle via the sequence, order and/or position of a dark fringe and a bright fringe as a function of time during the trajectory of the particle through the beam.

8. The system of claim 7, wherein the processor is configured to characterize said particle as a metal or a non-metal via the refractive index of the particle.

9. The system of claim 1, comprising:
    an adjuster operably connected to said photodetector or to said focusing system; wherein said adjuster moves said photodetector or alters said focusing system to balance the differential detection of the at least two elements of the photodetector.

10. The system of claim 9, wherein the adjustor is controlled via closed loop feedback control.

11. The system of claim 9, wherein said adjuster is operably connected to said photodetector and translates, moves, rotates or tilts said photodetector.

12. The system of claim 9, wherein said adjuster is a steering mirror or a lens operably connected to said focusing system and adjusts a path of said beam of electromagnetic radiation.

13. The optical collection system of claim 1 further comprising an imager, wherein said beam of electromagnetic radiation may be directed toward said imager and said imager provides feedback to said adjuster in a closed loop on optimal optical beam power density, optimal beam spot size, optimal area of high radiation density in said flow cell or any combination thereof.

14. The system of claim 1, wherein said beam of electromagnetic radiation is a Gaussian beam.

15. The system of claim 1, wherein said beam of electromagnetic radiation is a structured beam.

16. The system of claim 1, wherein said beam of electromagnetic radiation is a dark beam.

17. The system of claim 1, wherein said beam of electromagnetic radiation is an anamorphic beam in a top hat configuration.

18. The system of claim 1, wherein said photodetector comprises at least two detector elements and characterizes said particles based on a differential signal from individual signals from each detector element indicative of said particles.

19. The system of claim 1, wherein said focusing system directs said beam of electromagnetic radiation through said flow cell at least twice and said particles in said flow cell interact with a different portion of said beam on each individual pass through said flow cell.

20. The system of claim 1, wherein said focusing system comprises a half wave plate, a quarter wave plate or both for altering a polarization state of said beam.

21. The system of claim 1, comprising:
a translator operably connected to said flow cell for translating said flow cell closer to and further away from said focusing system such that said area of high radiation density changes position in said flow cell.

22. The system of claim 21, wherein said translator is an oscillator.

23. The system of claim 22, wherein said oscillator is a piezoelectric oscillator.

24. A system for detecting particles in a fluid, the system comprising:
a flow cell for flowing a fluid containing particles along a flow direction through a beam of electromagnetic radiation, an optical source in optical communication with the flow cell for providing the beam of electromagnetic radiation;

a focusing system in optical communication with the optical source for focusing said beam of electromagnetic radiation to generate an area of high radiation density within said flow cell; and an optical collection system for collecting and directing at least a portion of electromagnetic radiation onto a pixelated photodetector, wherein said optical collection system collimates or focuses said beam of electromagnetic radiation;

wherein for at least portion of the pixels of the pixelated photodetector each pixel has an area corresponding to a spatial extent of the particle beam interaction signal within the beam;

wherein the photodetector produces an electric signal characteristic of the number and/or size of the particles detected.

* * * * *